(12) United States Patent
Torres et al.

(10) Patent No.: US 11,927,991 B2
(45) Date of Patent: Mar. 12, 2024

(54) SYNCHRONIZED HINGES FOR FOLDABLE DISPLAYS

(71) Applicant: Dell Products, L.P., Round Rock, TX (US)

(72) Inventors: Christopher A. Torres, San Marcos, TX (US); Enoch Chen, Taipei (TW); Anthony J. Sanchez, Pflugerville, TX (US); Chia-Hao Hsu, New Taipei (TW); Hsu Hong Yao, New Taipei (TW); Mo-Yu Zhang, New Taipei (TW)

(73) Assignee: Dell Products, L.P., Round Rock, TX (US)

( * ) Notice: Subject to any disclaimer, the term of this patent is extended or adjusted under 35 U.S.C. 154(b) by 191 days.

(21) Appl. No.: 17/318,096

(22) Filed: May 12, 2021

(65) Prior Publication Data

US 2022/0365568 A1 Nov. 17, 2022

(51) Int. Cl.
*G06F 1/16* (2006.01)
*E05D 3/16* (2006.01)
*E05D 11/06* (2006.01)

(52) U.S. Cl.
CPC ............ *G06F 1/1681* (2013.01); *E05D 3/16* (2013.01); *E05D 11/06* (2013.01); *E05Y 2201/62* (2013.01); *E05Y 2900/606* (2013.01)

(58) Field of Classification Search
CPC ....... G06F 1/1681; G06F 1/1616; E05D 3/16; E05D 11/06; E05D 3/18; E05Y 2201/62; E05Y 2900/606
See application file for complete search history.

(56) References Cited

U.S. PATENT DOCUMENTS

| | | | | |
|---|---|---|---|---|
| 9,265,166 B2* | 2/2016 | Hsu | ................ | F16H 25/06 |
| 9,274,566 B1* | 3/2016 | Horng | ................ | G06F 1/1681 |
| 9,677,308 B1* | 6/2017 | Chen | ................ | E05D 3/18 |
| 9,898,050 B2* | 2/2018 | Xu | ................ | G06F 1/1681 |
| 10,100,970 B1* | 10/2018 | Wu | ................ | H05K 5/0226 |
| 10,435,933 B2* | 10/2019 | Lin | ................ | E05D 11/1028 |
| 10,480,225 B1* | 11/2019 | Hsu | ................ | E05D 3/12 |
| 10,520,988 B2* | 12/2019 | Hsu | ................ | G06F 1/1641 |
| 10,627,873 B2* | 4/2020 | Lan | ................ | G06F 1/1616 |
| 10,761,574 B1* | 9/2020 | Hsu | ................ | G06F 1/1626 |
| 10,824,204 B2* | 11/2020 | Lin | ................ | G06F 1/1681 |
| 10,837,209 B2* | 11/2020 | Lin | ................ | G06F 1/1616 |
| 11,009,061 B2* | 5/2021 | Chang | ................ | E05D 11/06 |
| 11,016,539 B2* | 5/2021 | Hallar | ................ | G06F 1/1618 |
| 11,016,541 B2* | 5/2021 | Lin | ................ | E05D 3/122 |
| 11,035,160 B2* | 6/2021 | Lin | ................ | G06F 1/1681 |
| 11,093,008 B2* | 8/2021 | Hallar | ................ | E05D 11/1028 |
| 11,142,932 B2* | 10/2021 | Hsu | ................ | E05D 3/122 |
| 11,174,925 B2* | 11/2021 | Hsu | ................ | F16H 3/12 |
| 11,301,006 B2* | 4/2022 | Hsu | ................ | G06F 1/1641 |
| 11,359,425 B2* | 6/2022 | Chang | ................ | G06F 1/1681 |
| 11,365,573 B2* | 6/2022 | Hsu | ................ | G06F 1/1681 |
| 11,408,214 B1* | 8/2022 | Hsu | ................ | E05D 3/18 |

(Continued)

*Primary Examiner* — Tara Schimpf
*Assistant Examiner* — Matthew J Sullivan
(74) *Attorney, Agent, or Firm* — Fogarty LLP

(57) ABSTRACT

Embodiments of synchronized hinges for foldable displays are described. In some embodiments, a hinge may include: a first bracket coupled to a first shaft via a first arm, a second bracket coupled to a second shaft via a second arm, and a synchronization bracket coupled to the first and second shafts.

20 Claims, 24 Drawing Sheets

(56) References Cited

U.S. PATENT DOCUMENTS

| | | | |
|---|---|---|---|
| 11,442,509 B2* | 9/2022 | Zhang | G06F 1/1616 |
| 11,579,661 B2* | 2/2023 | Kinoshita | E05D 11/082 |
| 2018/0239402 A1* | 8/2018 | Wang | E05D 3/18 |
| 2018/0329462 A1* | 11/2018 | Larsen | G06F 1/1681 |
| 2019/0250675 A1* | 8/2019 | Lin | E05D 11/0054 |
| 2020/0217114 A1* | 7/2020 | Comunello | E05D 15/264 |
| 2021/0165466 A1* | 6/2021 | Kang | G06F 1/1681 |
| 2021/0373611 A1* | 12/2021 | Lee | G06F 1/1681 |
| 2022/0120124 A1* | 4/2022 | Quynh | F16C 11/04 |
| 2022/0282754 A1* | 9/2022 | Zhang | F16C 11/04 |
| 2022/0346258 A1* | 10/2022 | Liu | G06F 1/1681 |
| 2022/0365569 A1* | 11/2022 | Hsu | F16C 11/04 |
| 2022/0377919 A1* | 11/2022 | Zhang | G06F 1/1681 |
| 2023/0014585 A1* | 1/2023 | Tang | E05D 3/122 |
| 2023/0050832 A1* | 2/2023 | Yang | H05K 5/0017 |

\* cited by examiner

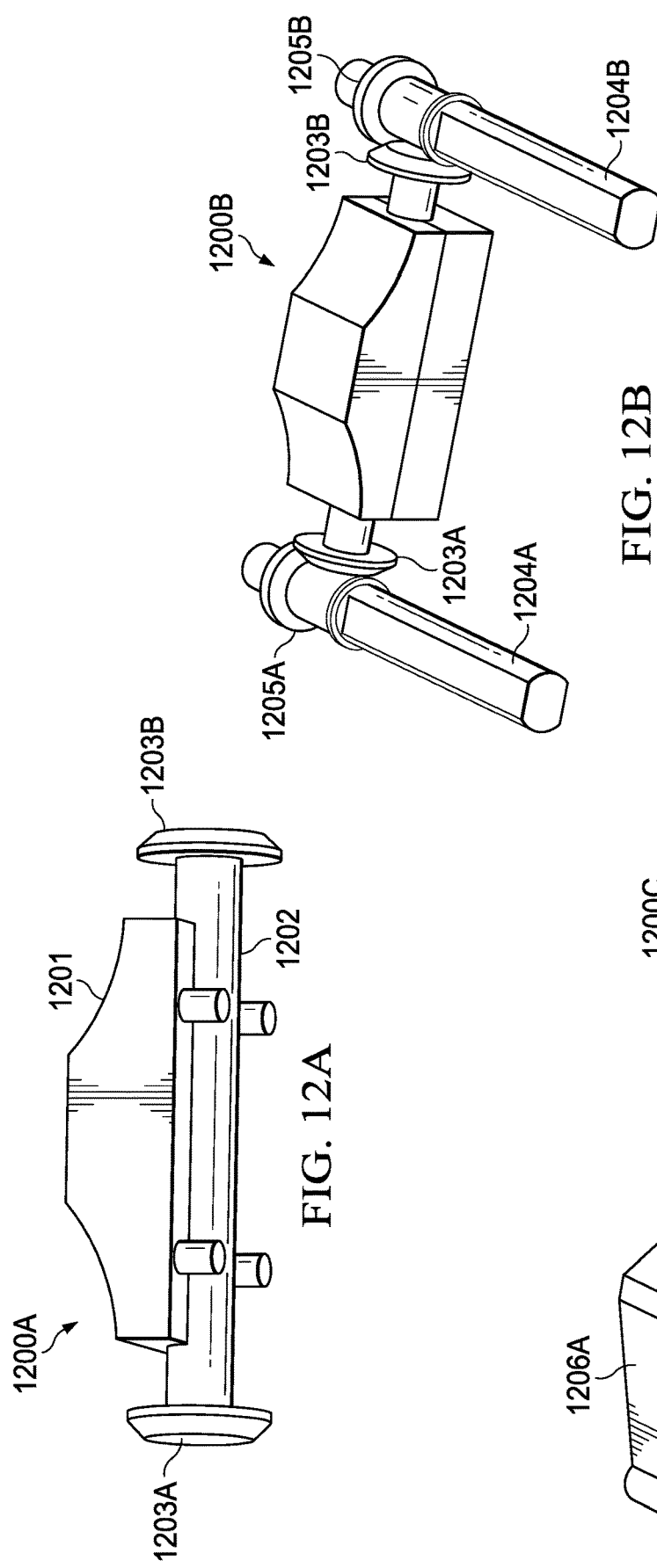
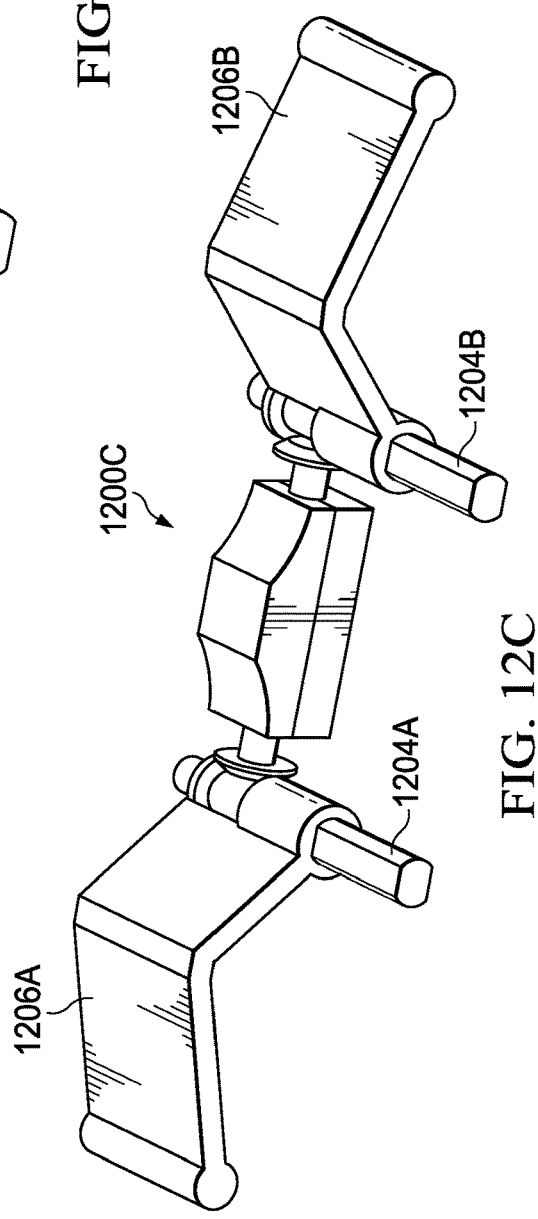
FIG. 12A
FIG. 12B
FIG. 12C

SYNCHRONIZED HINGES FOR FOLDABLE DISPLAYS

FIELD

The present disclosure relates generally to Information Handling Systems (IHSs), and more particularly, to synchronized hinges for foldable displays.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for synchronized hinges for foldable displays are described. In an illustrative, non-limiting embodiment, a hinge may include hinge may include: a first bracket coupled to a first shaft via a first arm, a second bracket coupled to a second shaft via a second arm, and a synchronization bracket coupled to the first and second shafts. The first shaft may be disposed along a first axis, the second shaft may be disposed along a second axis parallel to the first axis, and the first and second brackets may be configured to rotate around a center axis between the first and second axes.

Rotation of the first bracket around the center axis may cause: rotation of the first shaft around the first axis, translation of the synchronization bracket with respect to the first and second brackets, rotation of the second bracket around the second axis, and rotation of the second bracket around the center axis. A first amount of rotation of the first bracket around the center axis may be equal to a second amount of rotation of the second bracket around the center axis.

The hinge may also include a middle housing between the first and second brackets, where the first and second brackets each include a semi-circular lip coupled to a corresponding semi-circular slot on each side of the middle housing. The middle housing may be configured to restrict a maximum angle of rotation between the first and second brackets.

The first arm may be slidably coupled to a longitudinal slot of a lateral surface of the first bracket, and the second arm may be slidably coupled to a longitudinal slot of a lateral surface of the second bracket. Moreover, the first arm may be keyed to the first shaft, and the second arm may be keyed to the second shaft.

The synchronization bracket may include at least one first pin coupled to at least one first slot in the first shaft and at least one second pin coupled to at least one second slot in the second shaft. The at least one first pin may engage with a first entrance of the at least one first slot and the at least one second pin may engage with a second entrance of the at least one second slot in response to a straight angle between the first and second brackets. Additionally, or alternatively, at least one first pin may engage with a first end of the at least one first slot and the at least one second pin may engage with a second end of the at least one second slot in response to a zero angle between the first and second brackets.

The at least one first slot may at least partially spiral around a first surface of the first shaft, and the at least one second slot may at least partially spiral around the second shaft. A torque module may be coupled to the first and second shafts.

The hinge may further include: a third arm coupled to the first bracket and to a first torque shaft; a fourth arm coupled to the second bracket and to a second torque shaft; and a torque module coupled to the first and second torque shafts.

In some cases, the synchronization bracket may include a spur gear. Additionally, or alternatively, the synchronization bracket may include a bevel gear. Additionally, or alternatively, the synchronization bracket may include an internal thread configured to be coupled to a leadscrew. Additionally, or alternatively, the synchronization bracket may include a worm gear.

In another illustrative, non-limiting embodiment, an Information Handling System (IHS) may include: a flexible display and a hinge coupled to the flexible display, the hinge including: a first bracket coupled to a first shaft via a first arm; a second bracket coupled to a second shaft via a second arm; and a synchronization bracket coupled to the first and second shafts, where the first shaft is disposed along a first axis, where the second shaft is disposed along a second axis parallel to the first axis, and where the first and second brackets are configured to rotate around a center axis between the first and second axes.

In yet another illustrative, non-limiting embodiment, a method may include: providing a hinge and rotating a first bracket of the hinge around a center axis, where the rotation of the first bracket synchronously rotates a second bracket around the center axis, at least in part, by: rotating a first shaft around a first axis parallel to the center axis via a first arm coupled to a longitudinal slot of a lateral surface of the first bracket; translating a synchronization bracket with respect to the first and second brackets; and rotating a second shaft around a second axis parallel to the center axis via a second arm coupled to a longitudinal slot of a lateral surface of the second bracket.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIGS. 12A-E are views of an example of a synchronized hinge with a bevel gear mechanism, according to some embodiments.

DETAILED DESCRIPTION

Systems and methods are described for synchronized hinges for foldable displays used in Information Handling Systems (IHSs). As used herein, the terms foldable display is used to generally refer to an electronic visual display that is flexible in nature, as opposed to traditional flat screen displays with a front panel made of glass. Examples of foldable displays include, but are not limited to: electronic ink, organic liquid-crystal display (LCD), organic light-emitting diode (OLED) displays, etc.

As the inventors hereof have recognized, foldable displays are particularly susceptible to damage caused by cycling due to internal and external stresses and/or loads (e.g., fatigue). In many cases, the front of a foldable display also happens to be highly glossy, so any waviness, step, and/or gap on the surface of display is immediately apparent to the user.

Against this background, the inventors hereof have identified a need for a hinge system that enables the repeated bending of a flexible display (e.g., when an IHS is folded in half and then opened again, placed in a different posture, etc.) in a controlled and synchronized fashion, for optimal performance and extended useful life.

Accordingly, using systems and methods described herein, an IHS (e.g., a handheld device, laptop, etc.) with a foldable display, where two portions of the foldable display are fixed (i.e., without translation of the sides of the display), may be allowed to rotate from closed (e.g., 0° degrees) to open or flat (e.g., 180° degrees). These systems and methods may facilitate such rotation and may enable the display to move in a controlled fashion, around its folding region, while being supported when open and without inducing (or reducing) tensile or compressive stresses. In addition, these systems and methods may also allow cables, thermal components, mechanical structures and/or other internal components to operate through the IHS's full range of motion without damage or interruption. Synchronization may be controlled during the rotation of two or more portions of the foldable display.

Figure 1:
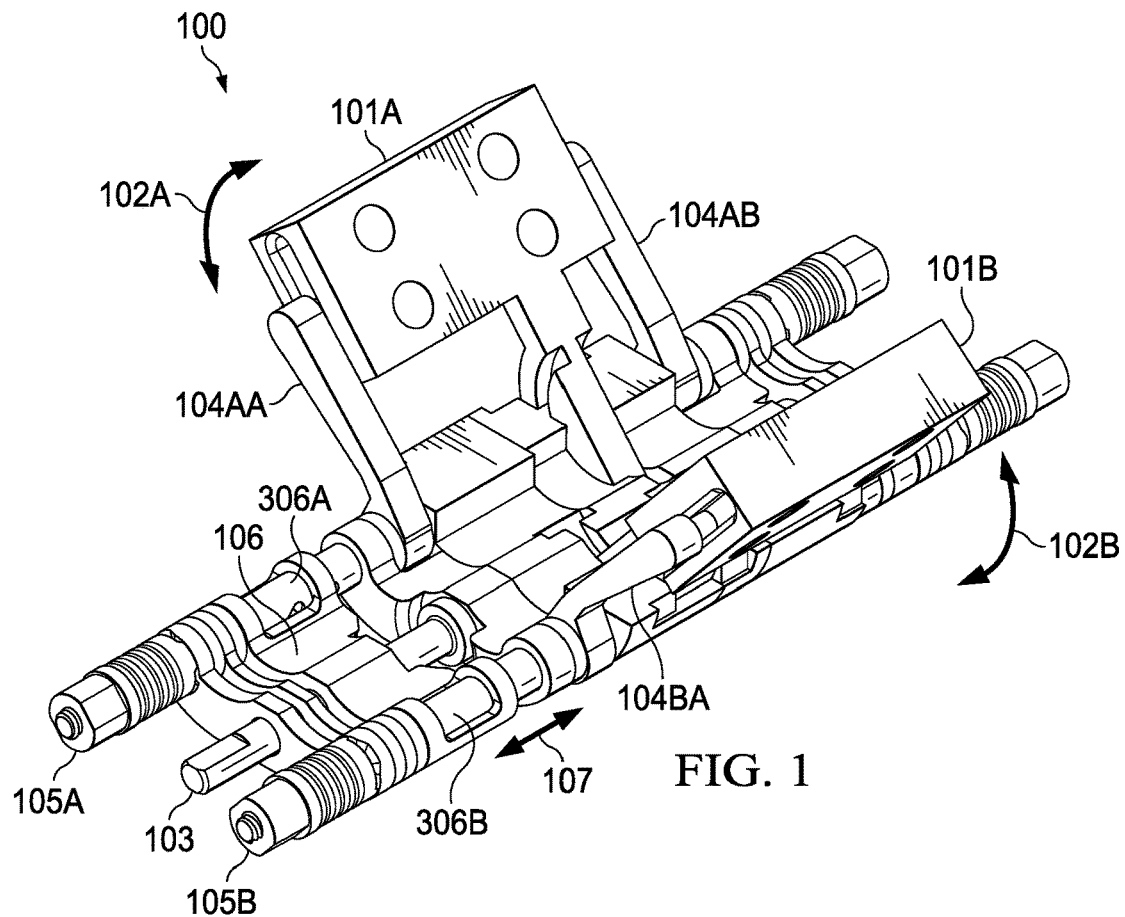
FIG. 1 is a view of an example of a synchronized hinge, according to some embodiments.

FIG. 1 is a view of an example of synchronized hinge 100, according to some embodiments. In this example, first bracket 101A rotates in direction 102A and second bracket 101B rotates in direction 102B, each around center axis 103. A first pair of torque arms 104AA and 104AB couple each side of first bracket 101A to first synchronization shaft 306A disposed along first synchronization axis 105A, and a second pair of torque arms 104BA and 104BB (shown in FIG. 2A) couple each side of second bracket 101B to second synchronization shaft 306B disposed along second synchronization axis 105B. Center axis 103 is disposed between axes 105A and 105B, and all three axes are parallel with respect to each other.

Synchronization bracket 106 couples first synchronization shaft 306A to second synchronization shaft 306B. As described in more detail below, the synchronization of hinge 100 uses a pin-and-slot mechanism: synchronization bracket 106 translates up and down along center axis 103 in direction 107, and it has two internal pins at each of its sides (FIG. 6B). Each rotating, synchronization shaft 306A and 306B has slot structures on its surface and is assembled into a corresponding side of synchronization bracket 106 by mating the bracket's pins to the shaft's slots (FIGS. 8A-C and 9A-C). Rotation of one synchronization shaft (e.g., 306A) moves synchronization bracket 106 in direction 107, which then causes the other synchronization shaft (e.g., 306B) to rotate simultaneously therewith.

For example, the folding of a flexible display may drive the rotation of first bracket 101A. As first bracket 101A rotates, first torque arm 104AA slides in a longitudinal slot along the side of first bracket 101A, and it rotates around first synchronization axis 105A. First synchronization shaft 306A is keyed to first torque arm 104AA and therefore also rotates. Pins in synchronization bracket 106 are pushed by slots in first synchronization shaft 306A, resulting in a lateral translation of synchronization bracket 106 in direction 107.

Translation of synchronization bracket 106 pushes the slots of second synchronization shaft 306B, thus resulting in its rotation. Second torque arm 104BA is keyed to and rotates with second synchronization shaft 306B around second synchronization axis 105B. Moreover, as second torque arm 104BA rotates, it slides in a longitudinal slot along the side of second bracket 101B, which rotates second bracket 101B around center axis 103. Rotation of second bracket 101B thus drives the second side of hinge 100 to rotate in an equal but opposite amount from the first side of hinge 100, in a synchronous fashion.

Figure 2A:
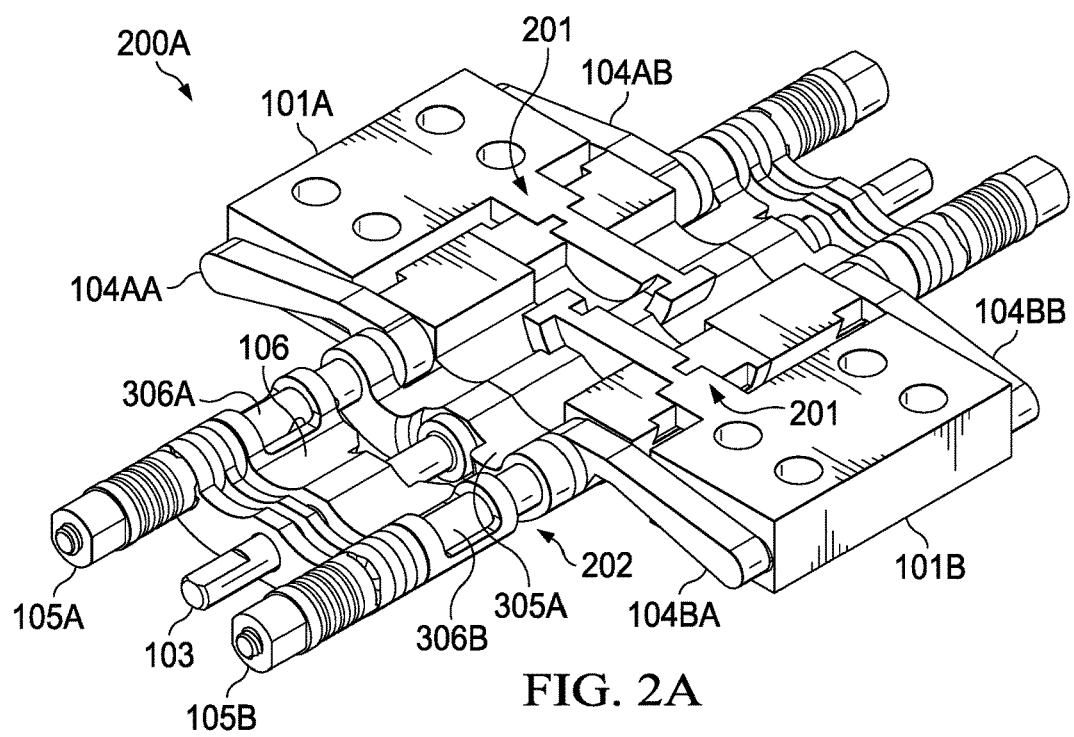
FIGS. 2A-C are views of an example of a synchronized hinge across its working range of motion, according to some embodiments.
Figure 2B:
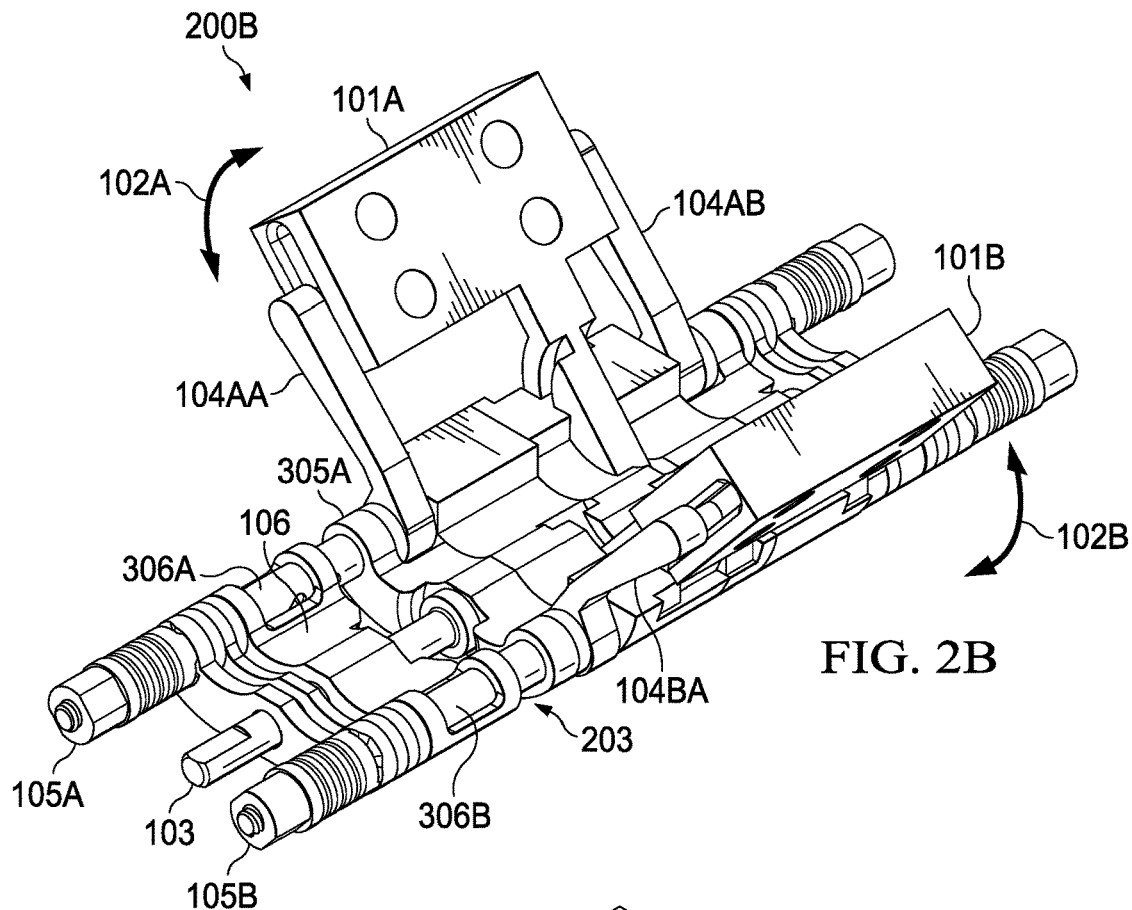
Figure 2C:
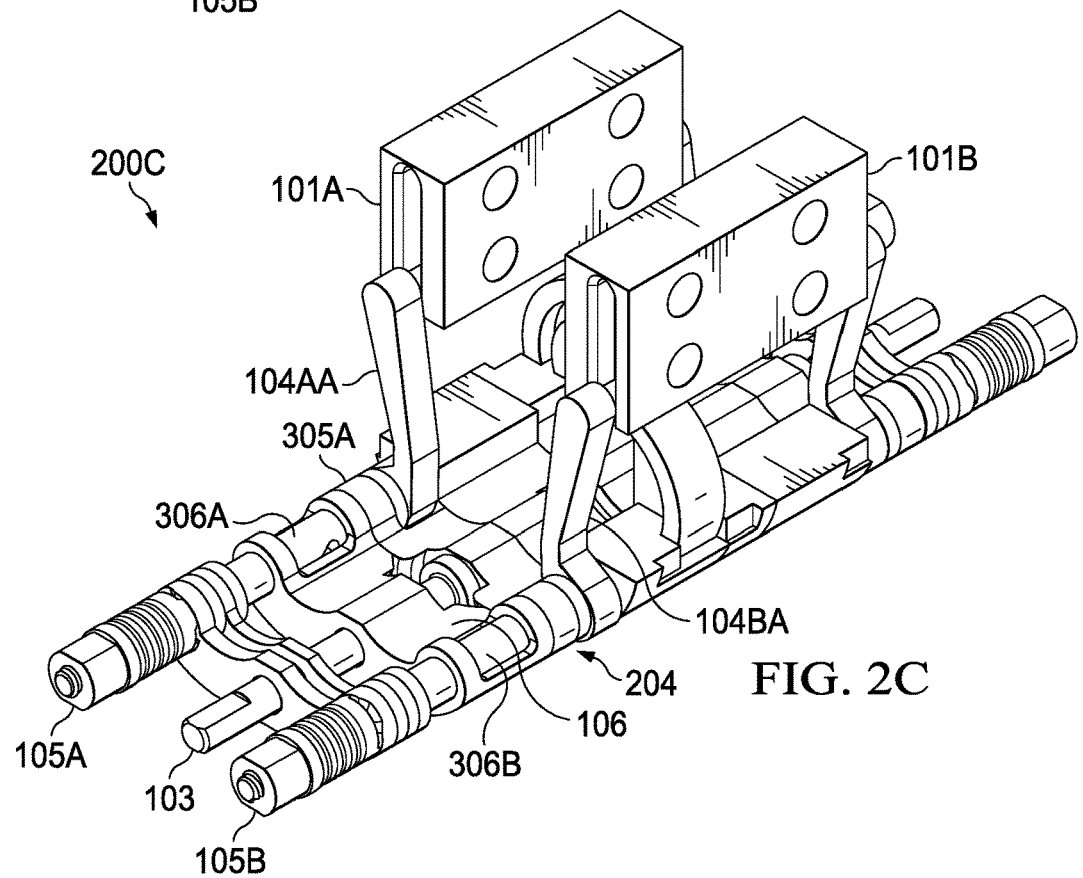

FIGS. 2A-C are views of an example of synchronized hinge 100 across its working range of motion, according to some embodiments. Specifically, FIG. 2A shows hinge 100 in open mode 200A—that is, with a 180° or straight degree angle between first bracket 101A and second bracket 101B, its maximum opening. In this configuration, synchronization bracket 106 is at first distance 202 from first fix bracket 305A and/or brackets 101A/B. In addition, stop features 201 are present in the minimum and maximum rotation points to keep brackets 101A and 101B from coming out of the tracks when not assembled.

FIG. 2B shows hinge 100 in a laptop configuration—that is, with a 90° or right degree angle between first bracket 101A and second bracket 101B. Synchronization bracket 106 is at second distance 203 from first fix bracket 305A and/or brackets 101A/B, such that second distance 203 is smaller than first distance 202.

FIG. 2C shows hinge 100 in a closed configuration—that is, with a zero degree angle between first bracket 101A and second bracket 101B. Synchronization bracket 106 is at third distance 204 from first fix bracket 305A and/or brackets 101A/B, such that third distance 204 is smaller than second distance 203 (e.g., zero).

Figure 3:
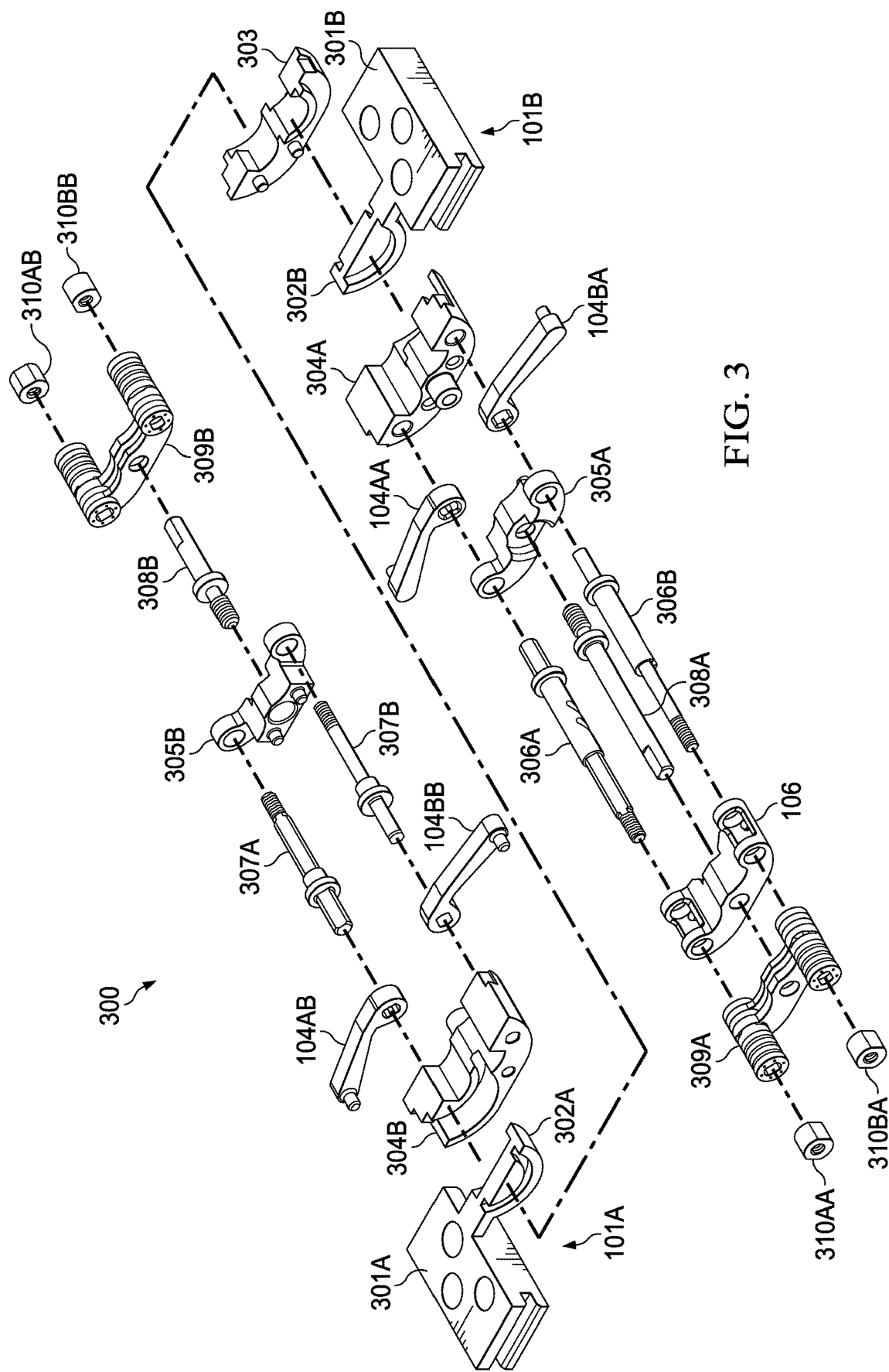
FIG. 3 is an exploded view of an example of a synchronized hinge, according to some embodiments.

FIG. 3 is an exploded view of an example of synchronized hinge 100, according to some embodiments. As shown, synchronized hinge 100 includes first bracket 101A having flat portion 301A to which one side of a foldable display may attach, and a rotating portion 302A comprising a semi-circular notch or lip. Second bracket 101B has flat portion 301B to which another side of the foldable display may attach, and rotating portion 302B comprising another semi-circular notch or lip. Each of the semi-circular notches or lips in rotating portions 302A and 302B mate to a corresponding semi-circular notch or lip in middle housing 303, which enables first and second brackets 101A and 101B to rotate around center axis 103.

First and second outer housings 304A and 304B are coupled to middle housing 303, and each includes another semi-circular notch or lip matching the semi-circular notches or lips of middle housing 303. Torque arms 104AA and 104BA are coupled to first outer housing 304A, and torque arms 104AB and 104BB are coupled to second outer housing 304B. Each of torque arms 104AA, 104AB, 104BA, and 104BB has a pin that slides along a corresponding longitudinal slot on the side of a respective one of brackets 101A and 101B.

First synchronization shaft 306A is coupled to, and keyed to, torque arm 104AA through first fix bracket 305A along first synchronization axis 105A. Second synchronization shaft 306B is coupled to, and keyed to, torque arm 104BA through first fix bracket 305A along second synchronization axis 105B. First crew pin 308A is also coupled to first fix bracket 305A along center axis 103.

Synchronization bracket 106 is coupled to first synchronization shaft 306A, second synchronization shaft 306B, and first screw pin 308A. First torque module 309A (e.g., disc type) is also coupled to is coupled to first synchronization shaft 306A, second synchronization shaft 306B, and first screw pin 308A. Nuts 310AA and 310BA are coupled to each side of first torque module 309A and enable torque adjustments usable to control, at least in part, the ease or difficultly with which a user can open or close synchronized hinge 100.

First torque shaft 307A is coupled to torque arm 104AB through second fix bracket 305B along first synchronization axis 105A. Second torque shaft 307B is coupled to torque arm 104BB through second fix bracket 305B along second synchronization axis 105B. Second screw pin 308B is aligned with first screw pin 308A along center axis 103. Second torque module 309B is coupled to second fix bracket 305B, and nuts 310AB and 310BB are coupled to each side of second torque module 309B.

Figure 4A:
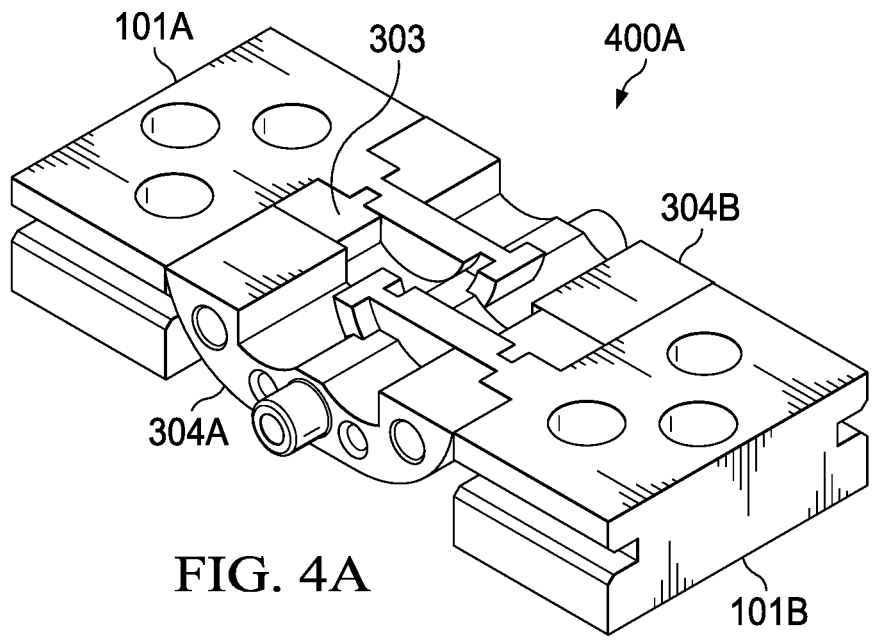
FIGS. 4A-D are views of examples of modular hinge variations, according to some embodiments.
Figure 4B:
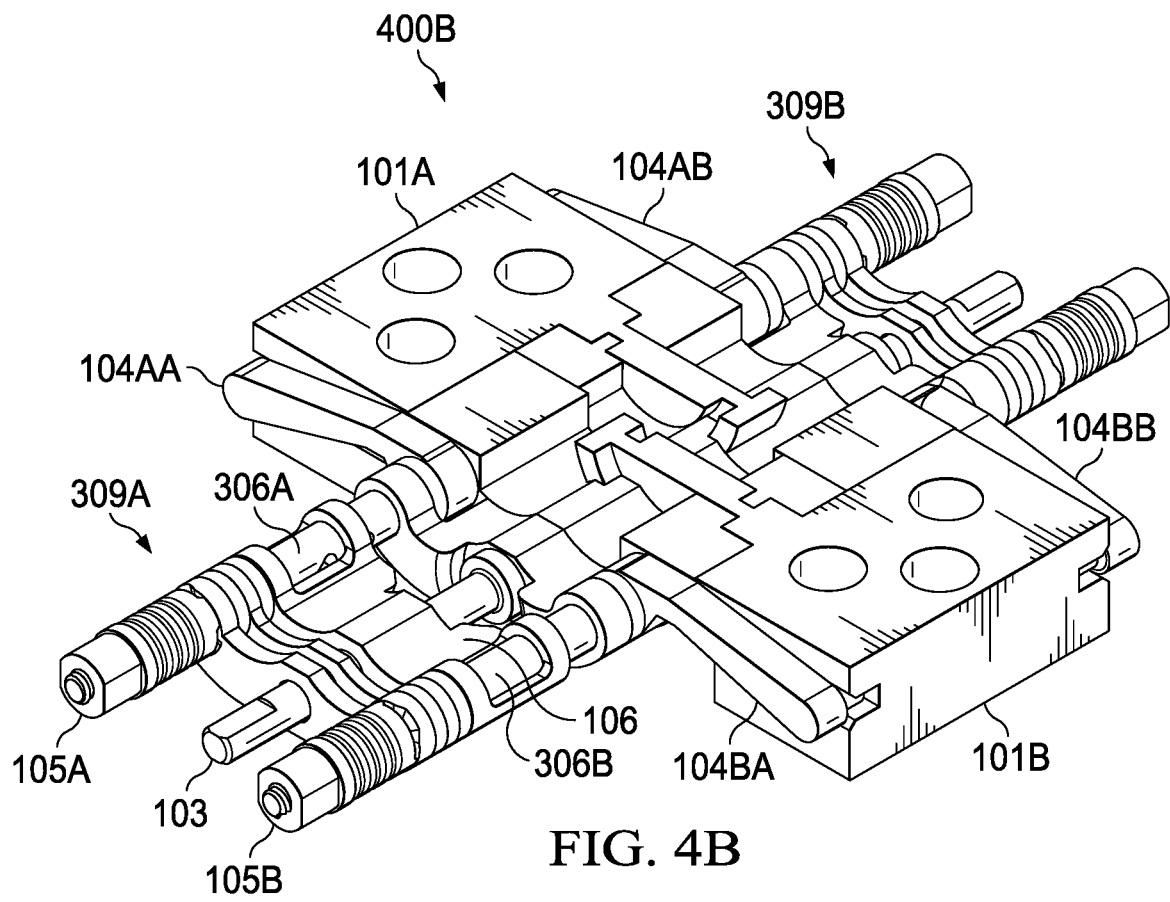
Figure 4C:
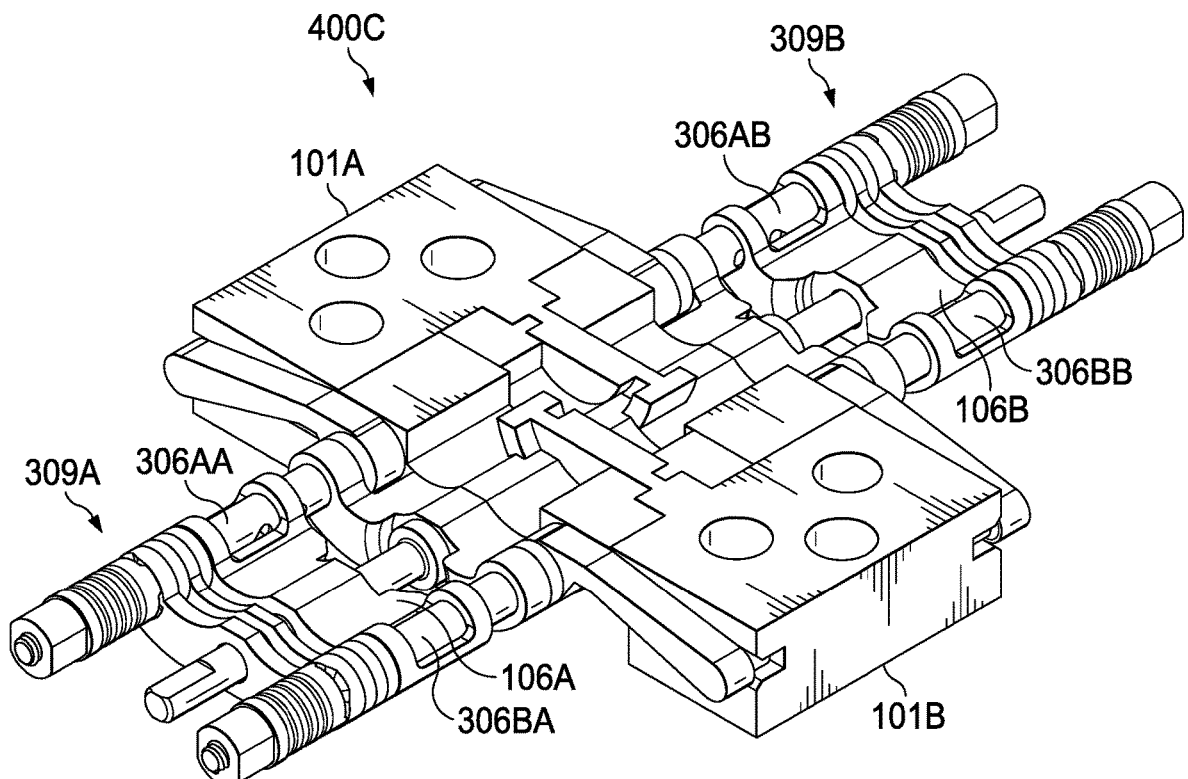
Figure 4D:
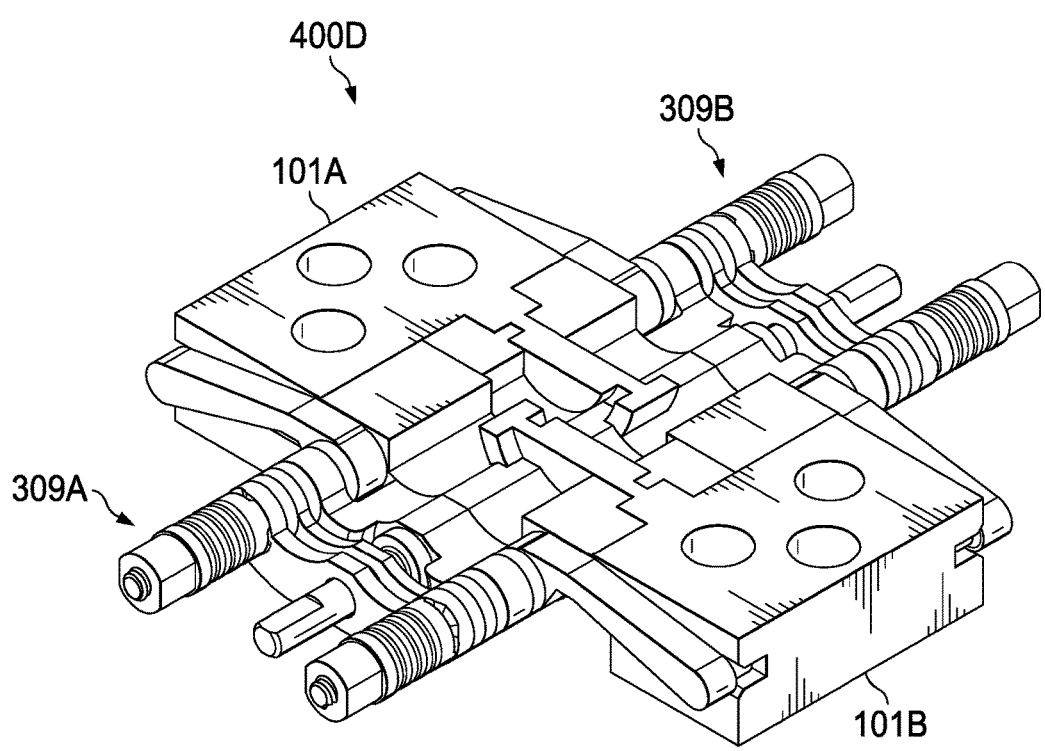

FIGS. 4A-D are views of examples of modular hinge variations, according to some embodiments. Particularly, FIG. 4A shows base module or idler hinge 400A; that is, one lacking both a synchronization bracket and a torque module. FIG. 4B shows hinge 400B with a single synchronization bracket 106 and two torque modules 309A and 309B. FIG. 4C shows hinge 400C having two synchronization brackets 106A and 106B and two torque modules 309A and 309B, one on each side. FIG. 4D shows a torque-only hinge 400D with and two torque modules 309A and 309B, but lacking a synchronization bracket. In various embodiments, these various modular hinges 400A-D may be used in combination as part of the same hinge system of an IHS with a foldable display, which can provide significant design flexibility to meet various engineering requirements.

Figure 5:
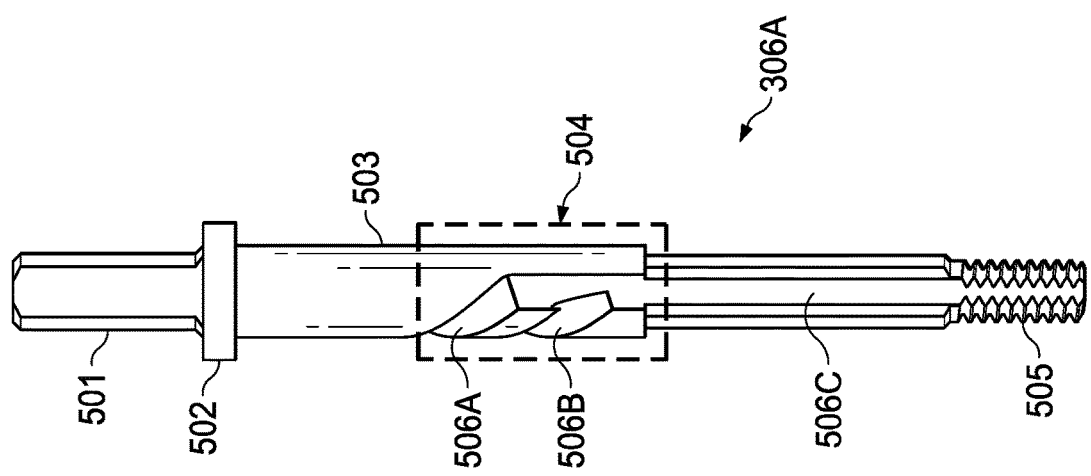
FIG. 5 is a view of an example of a synchronization shaft, according to some embodiments.

FIG. 5 is a view of an example of synchronization shaft 306A (or 306B), according to some embodiments. Particularly, synchronization shaft 306A includes key portion 501, ring or stopper portion 502, shaft portion 503 having synchronization portion 504, and threaded portion 505. As shown, synchronization portion 504 includes a pair of spiraling notches 506A and 506B coupled to the same longitudinal notch or channel 506C. Although two spiraling notches 506A and 506B are shown, in other implementations any number of spiraling notches may be used. In operation, synchronization shaft 306A rotates around first synchronization axis 105A by actuation of pins internal to synchronization bracket 106 upon spiraling notches 506A and 506B.

Figure 6A:
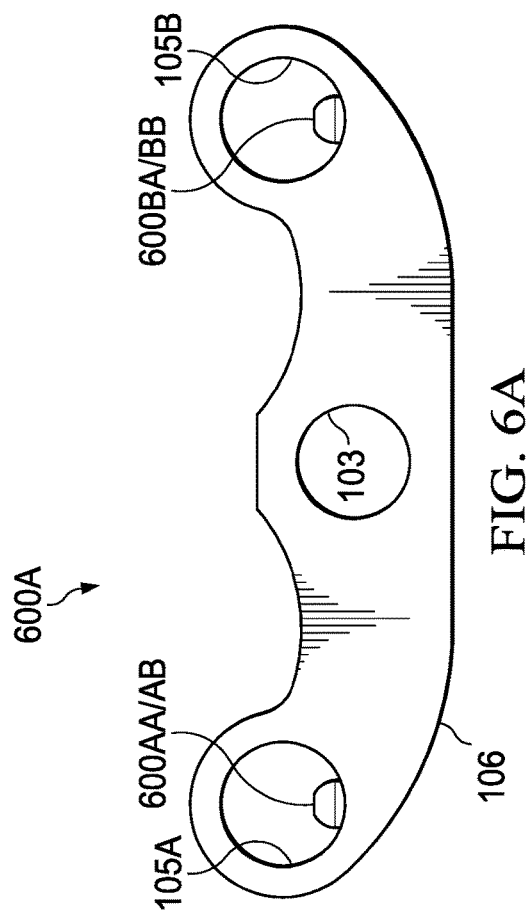
FIGS. 6A and 6B are views of an example of a synchronization bracket, according to some embodiments.
Figure 6B:
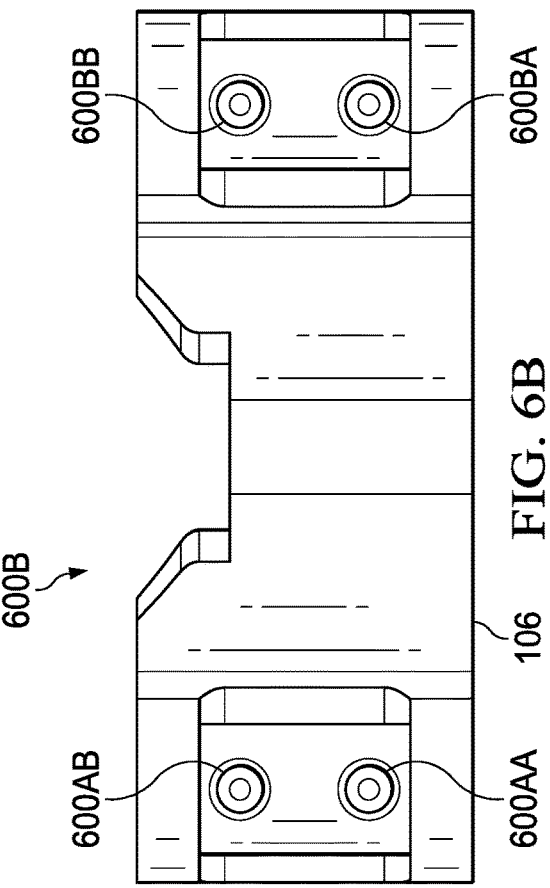

FIGS. 6A and 6B show views 600A and 600B, respectively, of synchronization bracket 106 having internal pins 600AA and 600AB on one side where first synchronization shaft 306A is inserted. Synchronization bracket 106 also has internal pins 600BA and 600BB on another side where second synchronization shaft 306B is inserted. Although two pins per side are shown, in other implementations any number of pins (matching the number of spiraling notches in synchronization shafts 306A and 306B) may be used. In operation, synchronization bracket 106 translates in direction 107 by actuation of spiraling notches 506A and 506B upon internal pins 600AA and 600AB.

Figure 7:
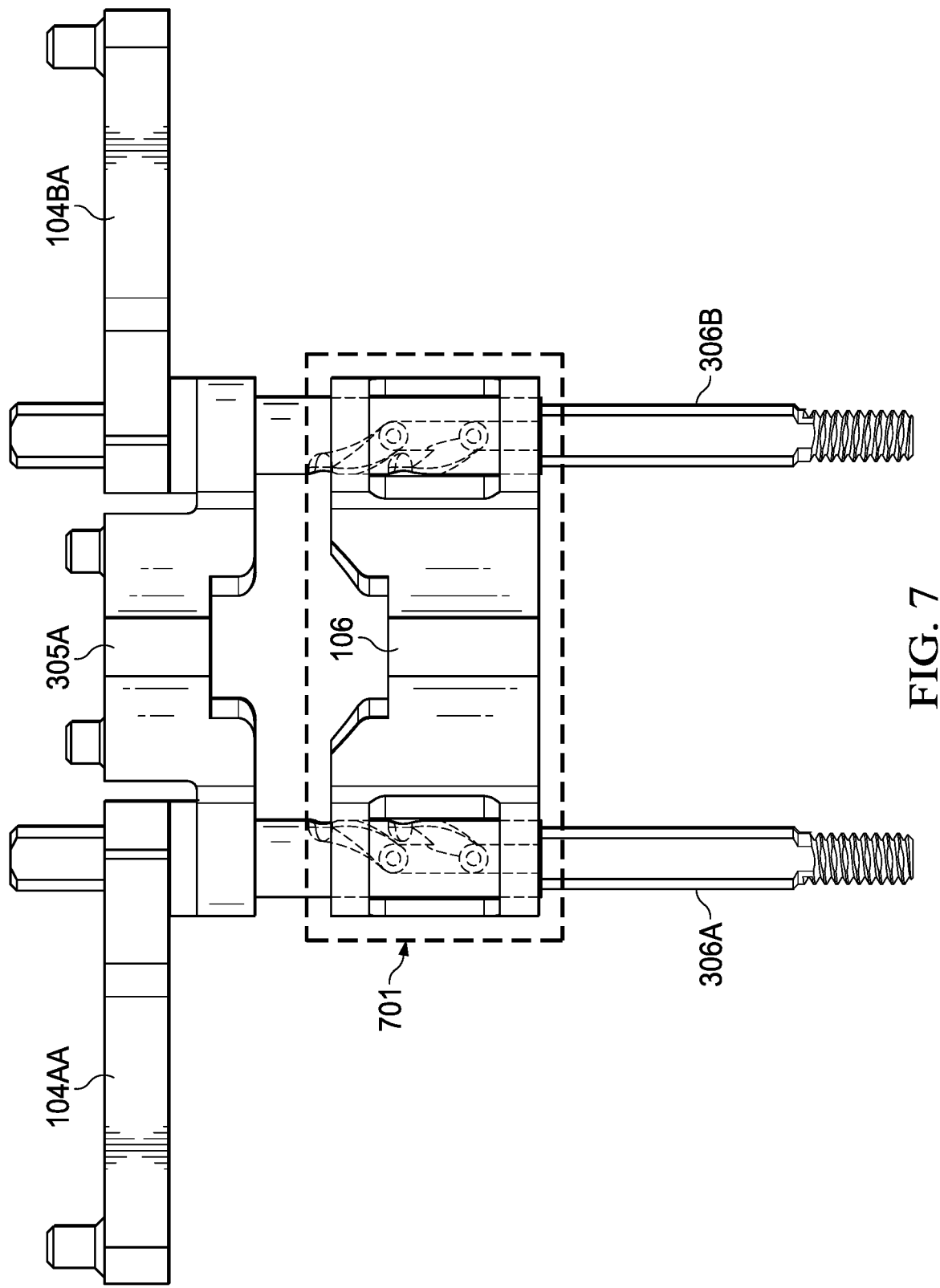
FIG. 7 is a view of a synchronization bracket and two synchronization shafts assembled together, according to some embodiments.

FIG. 7 is a view of synchronization bracket 106 and two synchronization shafts 306A and 306B assembled, according to some embodiments. As shown in block 701, internal pin 600AB of synchronization bracket 106 is mated to spiraling notch 506A of first synchronization shaft 306A and internal pin 600AA of synchronization bracket 106 is mated to spiraling notch 506B of first synchronization shaft 306A. The pin-and-slot design is symmetric with respect to second synchronization shaft 306B so that movement of pins 600AA-BB synchronizes rotation of both synchronization shafts 306A and 306B with the translation of synchronization bracket 106 along center axis 103 in direction 107.

Figure 8A:
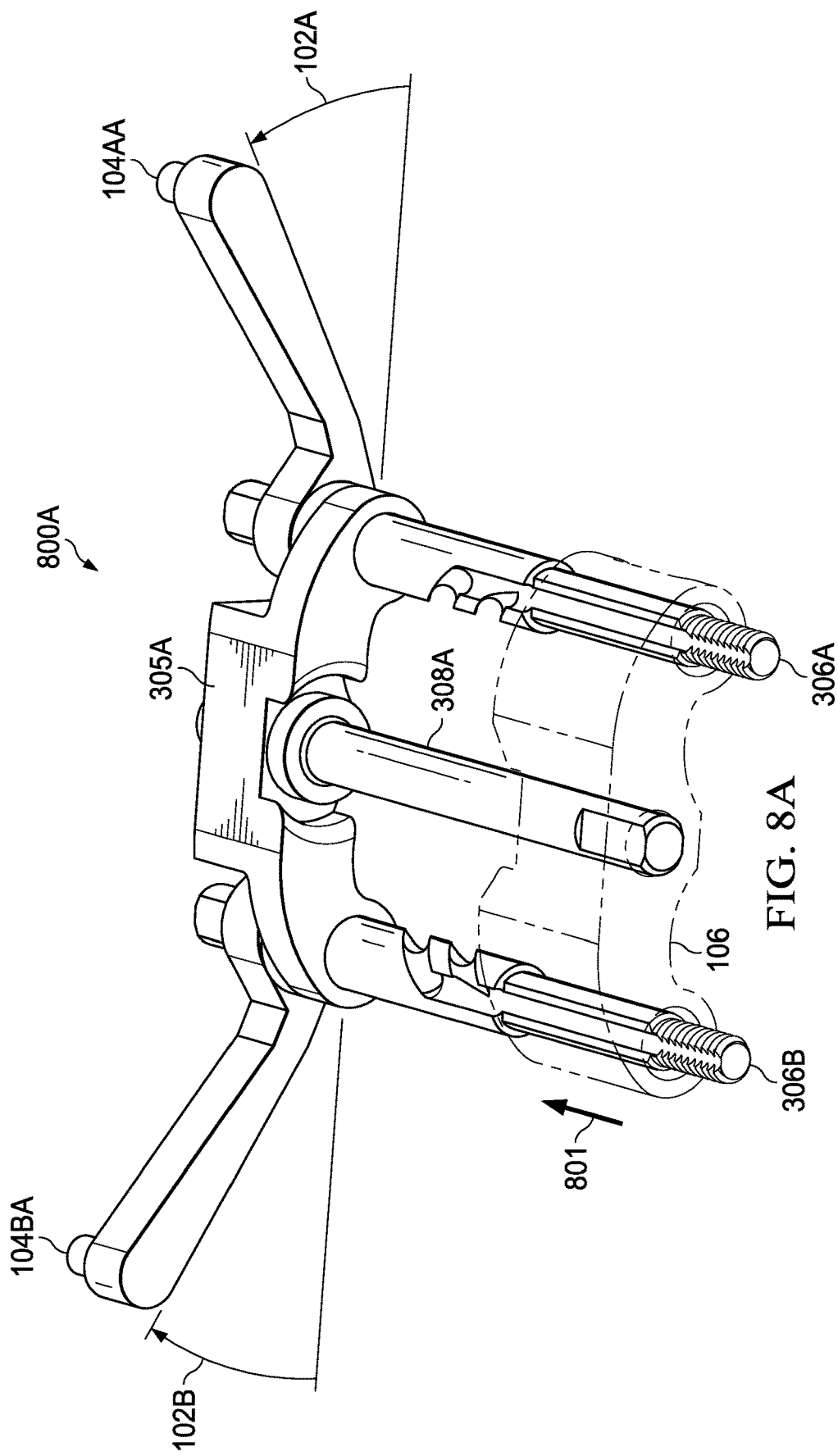
FIGS. 8A-C and 9A-C illustrate an example of a synchronized hinge assembly method, according to some embodiments.
Figure 8B:
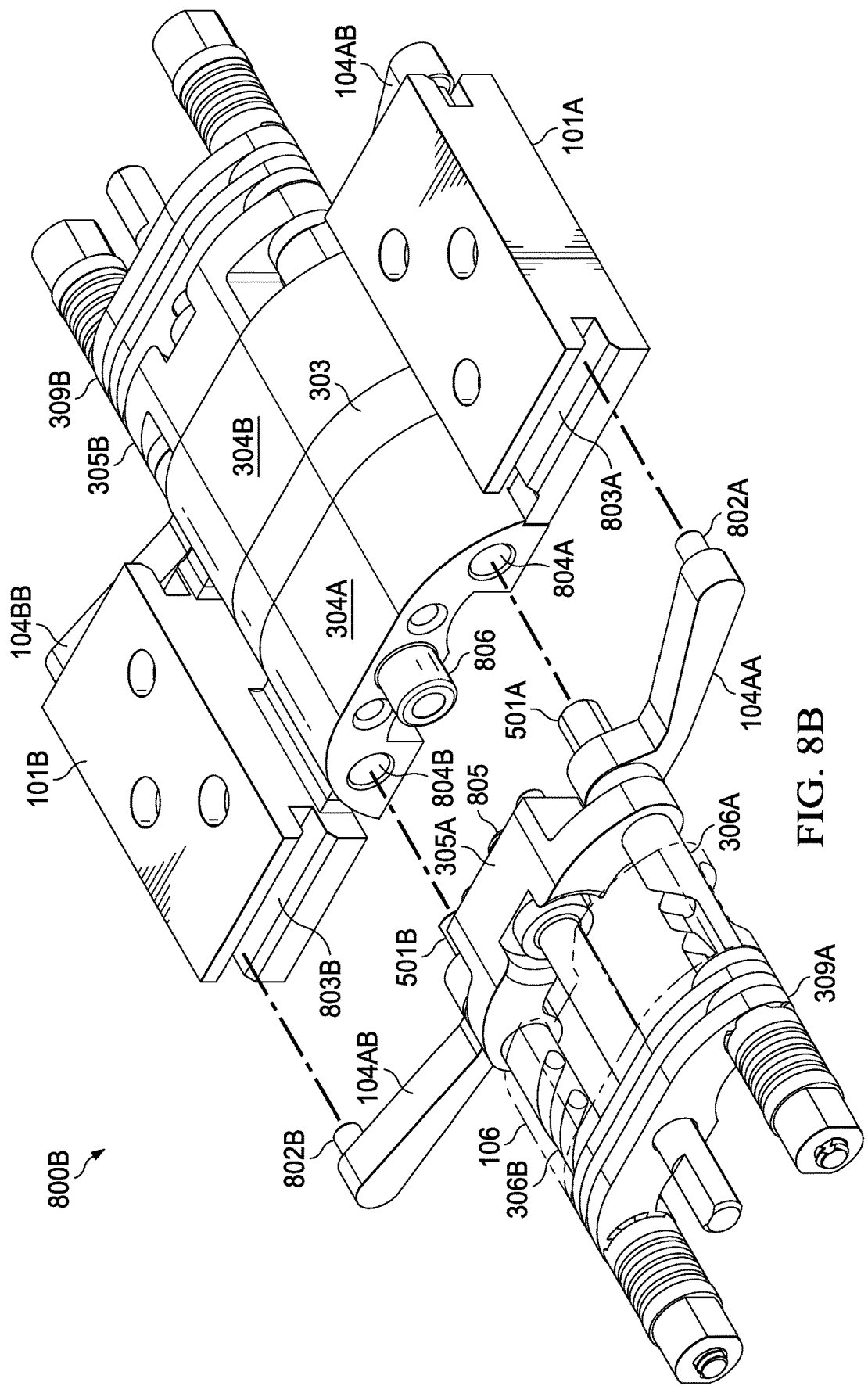
Figure 8C:
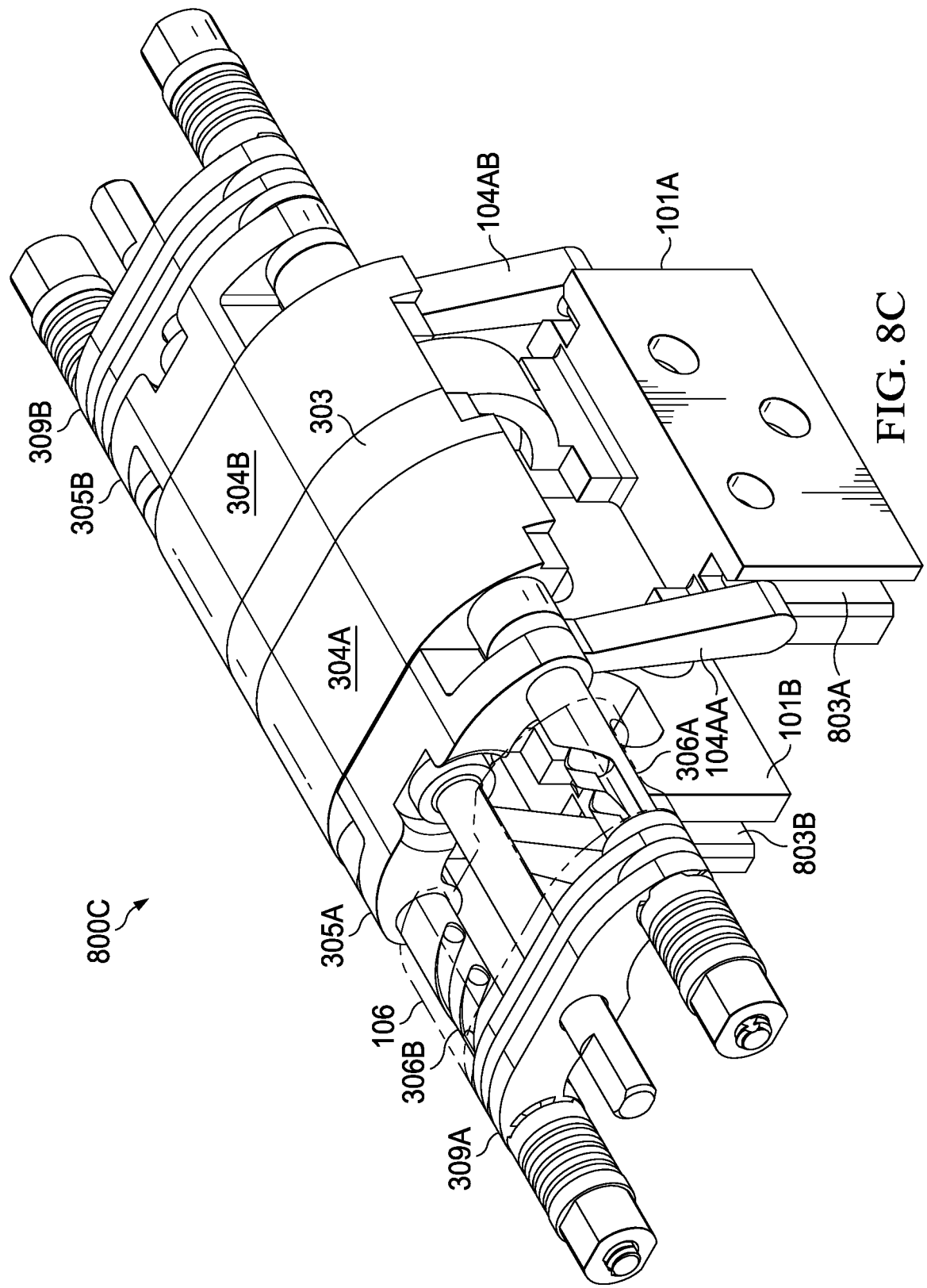
Figure 9A:
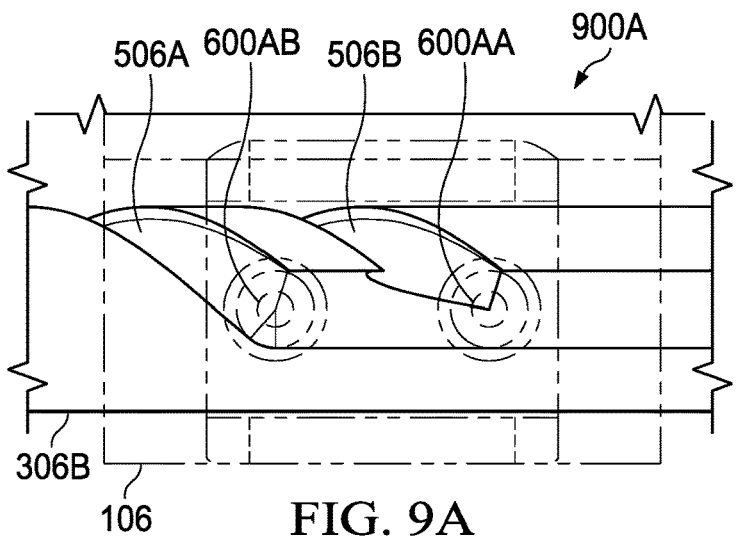

FIGS. 8A-C and 9A-C illustrate an example of a synchronized hinge assembly method, according to some embodiments. In FIG. 8A, in configuration 800A bracket 106 translates in direction 801 with internal pins 600AA and 600AB sliding along longitudinal notch 506C of synchronization shaft 306A. At this point, pins 600AA and 600AB have not yet entered spiraling notches 506A and 506B. To illustrate this in more detail, FIG. 9A shows configuration 900A where pin 600AB is at the entrance of spiraling notch 506A and pin 600AA is at the entrance of spiraling notch 506B.

Figure 9B:
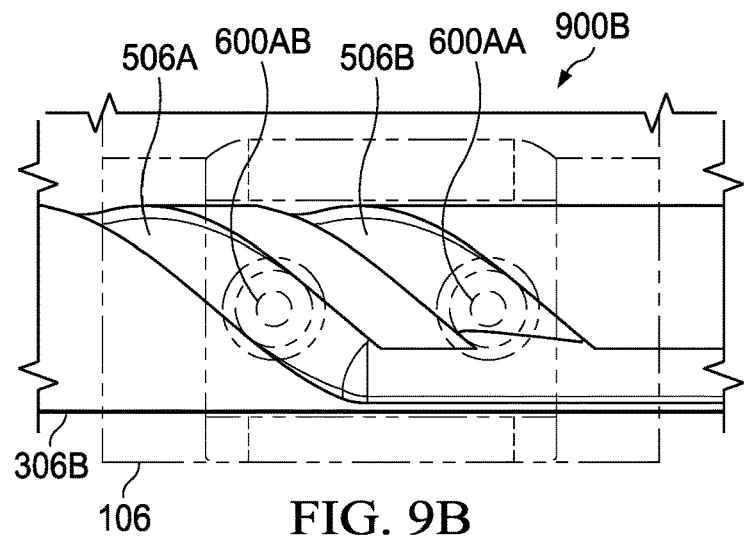

In FIG. 8B, in open configuration 800B, pin 802A is coupled to notch 803A, pin 802B is coupled to notch 803B, first keyed portion 501A is coupled to hole 804A, second keyed portion 501B is coupled to hole 804B, and center pin 805 is coupled to center hole 806. Upon rotation of first and second brackets 101A and 101B, synchronization bracket 106 translates further with internal pins 600AA and 600AB sliding along spiraling notches 506B and 506A, respectively. To illustrate this in more detail, FIG. 9B shows configuration 900B where pin 600AB is fully engaged with spiraling notch 506A and pin 600AA is fully engaged with spiraling notch 506B.

Figure 9C:
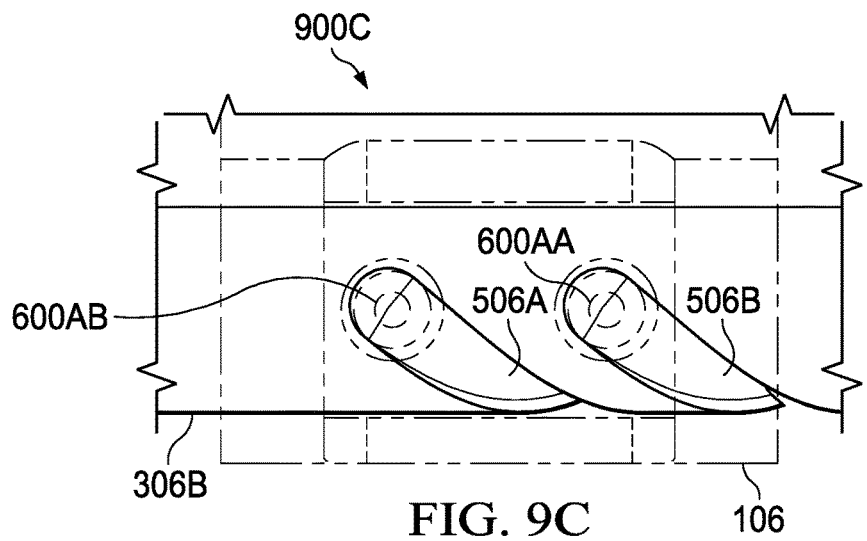

In FIG. 8C, in closed configuration 800C, first and second brackets 101A and 101B are rotated to their minimum angle such that synchronization bracket 106 has translated all the way up along axis 103, with pins 600AA and 600AB reaching the ends of spiraling notches 506B and 506A, respectively. To illustrate this in more detail, FIG. 9C shows configuration 900C where pin 600AB is at the end of spiraling notch 506A and pin 600AA is at the end of spiraling notch 506B.

Figure 10A:
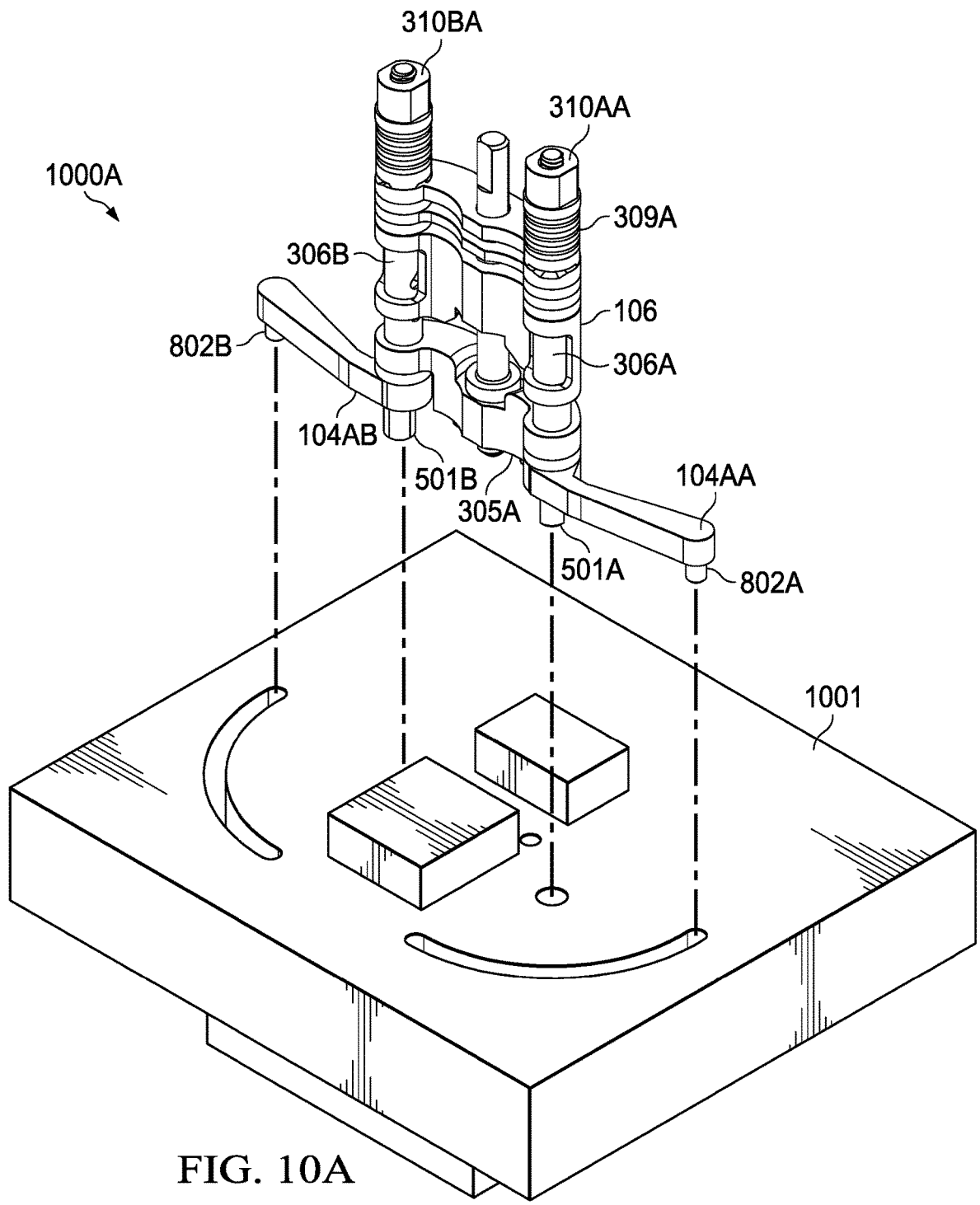
FIGS. 10A and 10B illustrate an example of a toque adjustment method, according to some embodiments.
Figure 10B:
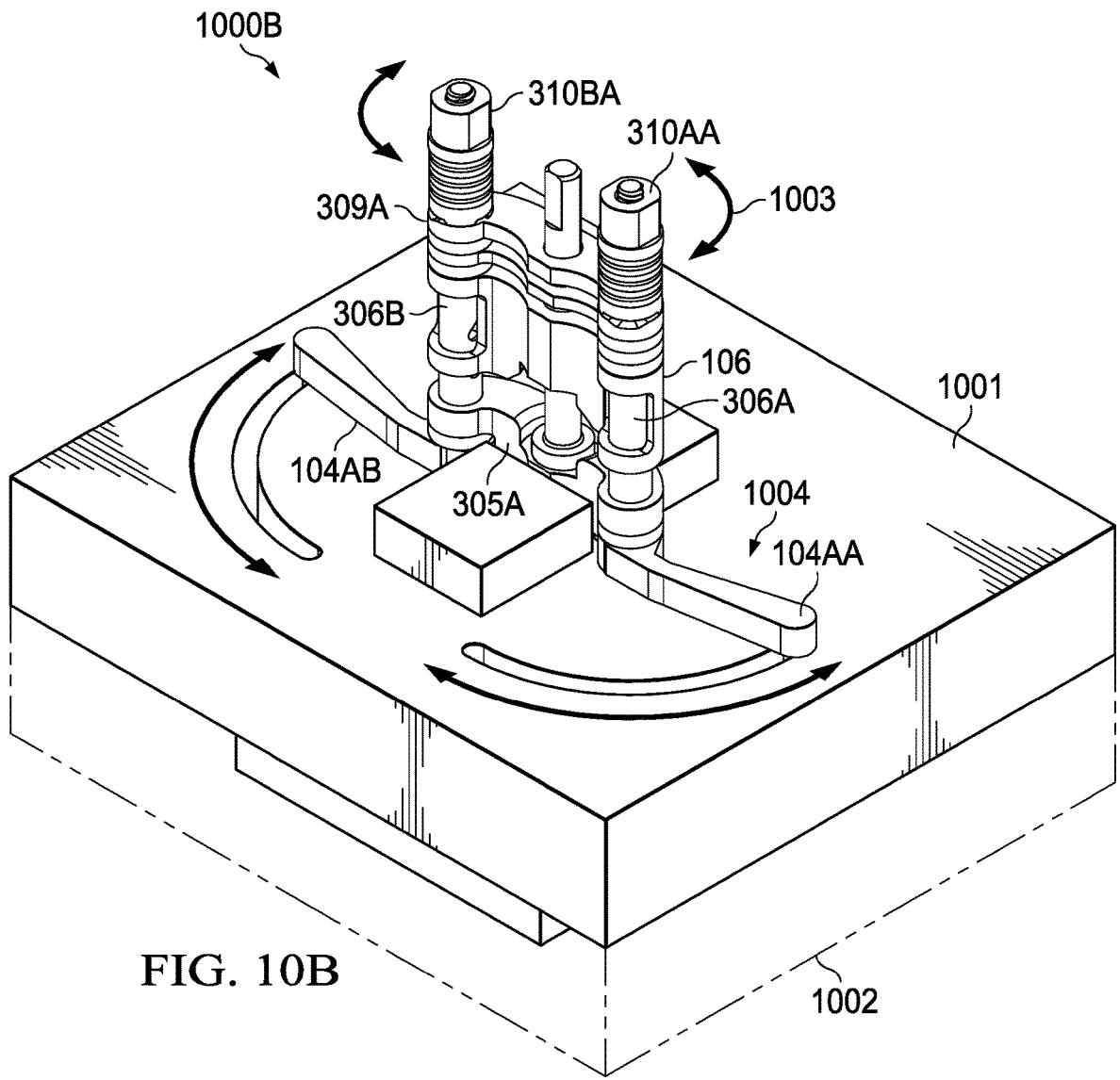

FIGS. 10A and 10B illustrate an example of a toque adjustment method, according to some embodiments. Particularly, torque modules 309A and 309B may be preset prior to final assembly using a torque adjustment system. This allows each individual hinge's torque value to be dialed-in based on part variance resulting in optimal performance and/or increased useful life.

In some implementations, torque may be added to the ends of hinge 100 as required by the final design, and/or an auto-lock/torque release feature may be added to reduce the opening torque and aid in keeping the IHS closed.

As shown in configuration 1000A of FIG. 10A, pins 802A, 802B, 501A and 501B may be coupled to corresponding holes and/or slots in torque adjustment fixture 1001. In configuration 1000B of FIG. 10B, fixture 1001 may be coupled to toque tester 1002. Once pins 802A, 802B, 501A, and 501B are inserted into fixture 1001, an assembler may tighten or loosen nuts 310AA and 310BA in operation 1003 to adjust the torque value of a corresponding arm 104AA and 104AB, respectively. Operation 1004 shows that the assembler may then rotate arm 104AA, for example, to test the assembly and/or to measure a current torque value.

FIGS. 11A-F are views of an example of a synchronized hinge with a spur gear mechanism, according to some embodiments. In this alternative implementation, a plurality of spur gears may be used to synchronize the rotation of first bracket 101A with second bracket 101B.

Figure 11A:
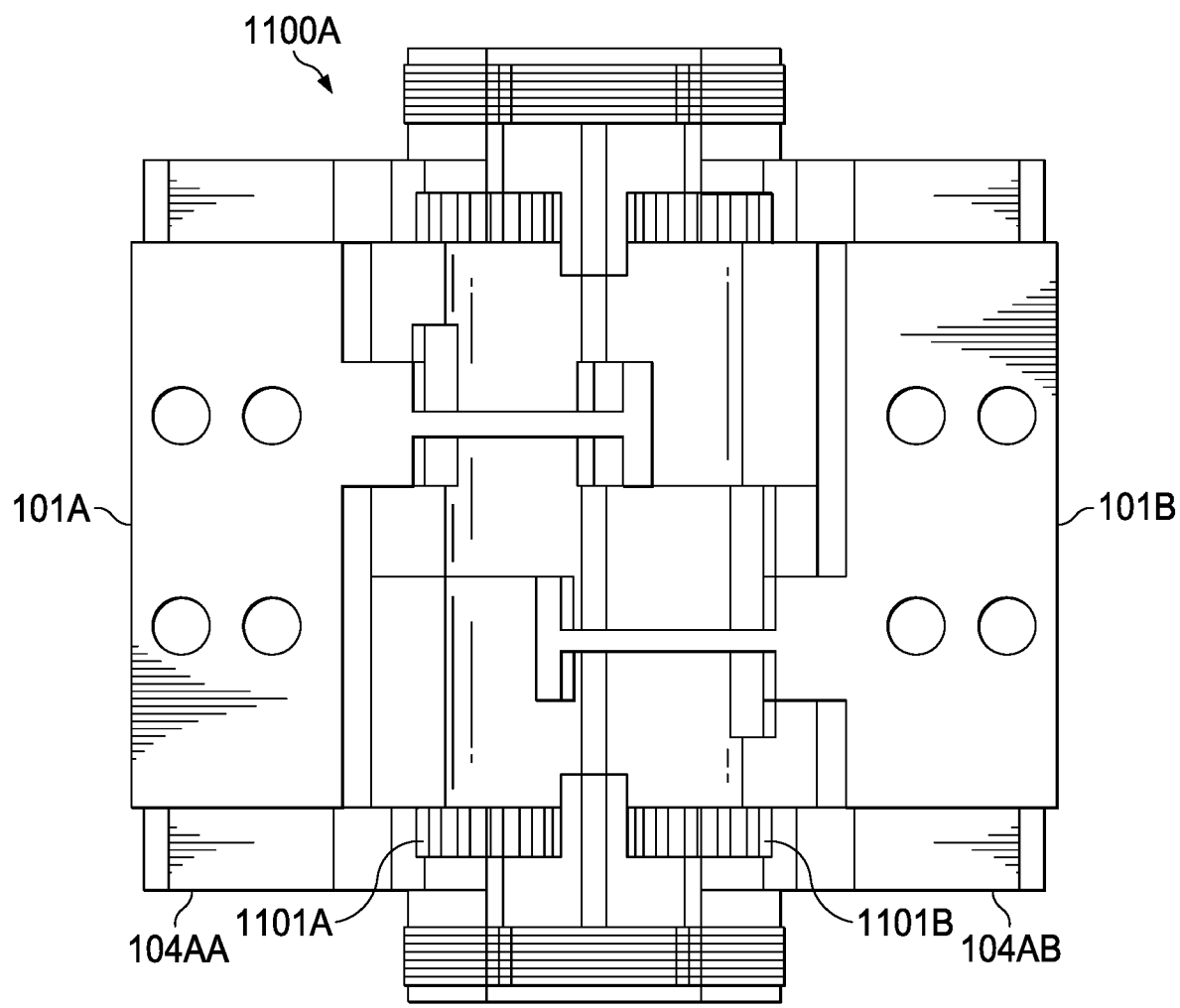
FIGS. 11A-F are views of an example of a synchronized hinge with a spur gear mechanism, according to some embodiments.
Figure 11B:
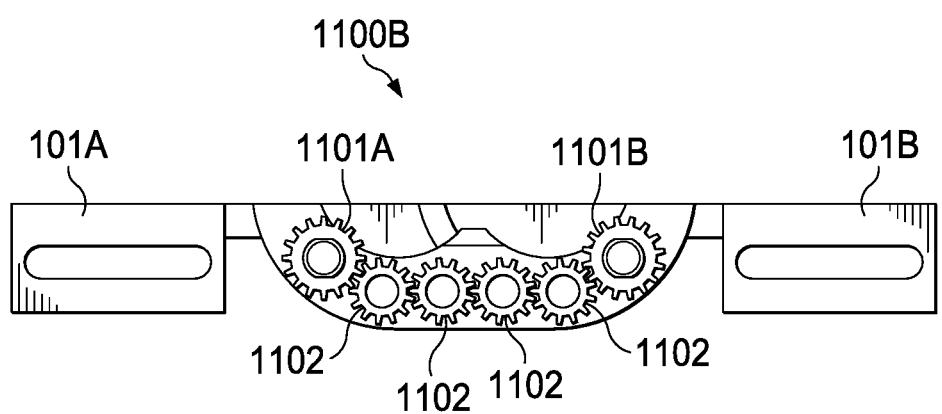

For example, views 1100A and 1100B of FIGS. 11A and 11B show outer most gears 1101A and 1101B tied to torque arms 104AA and 104AB, respectively. Gears 1101A and 1101B are coupled to each other via intermediary gears 1102, and first and second brackets 101A and 101B have a 180° degree angle between them.

Figure 11C:
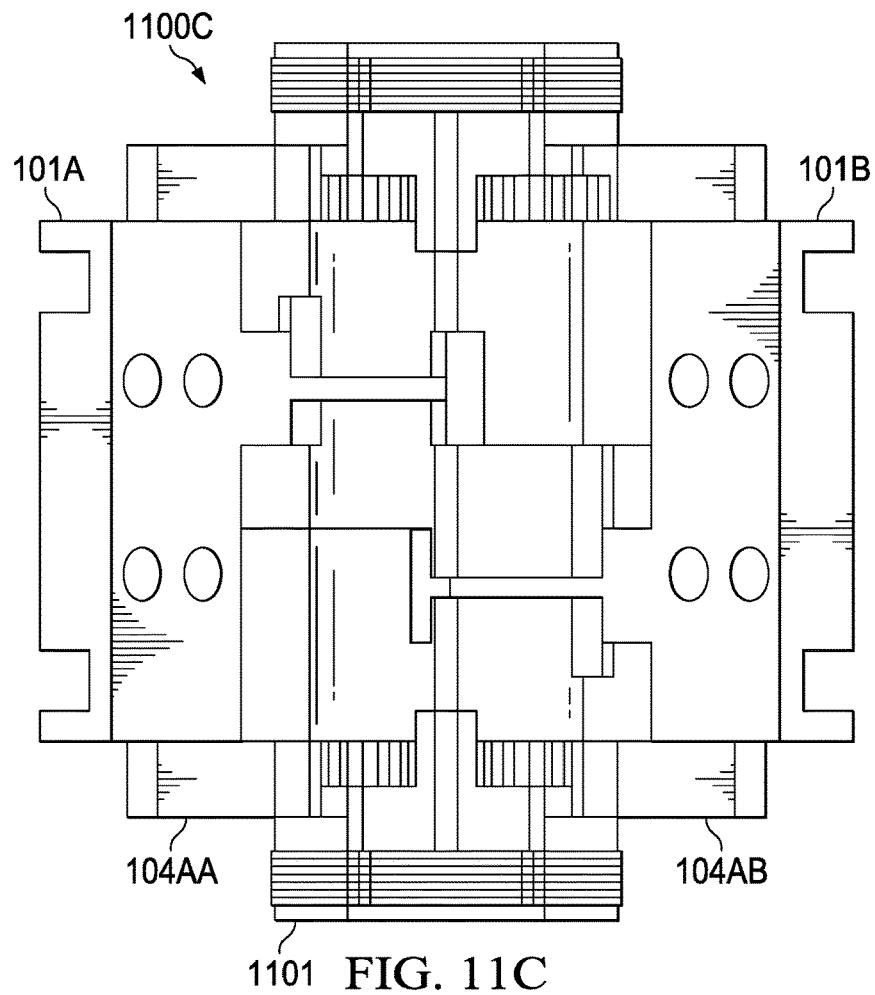
Figure 11D:
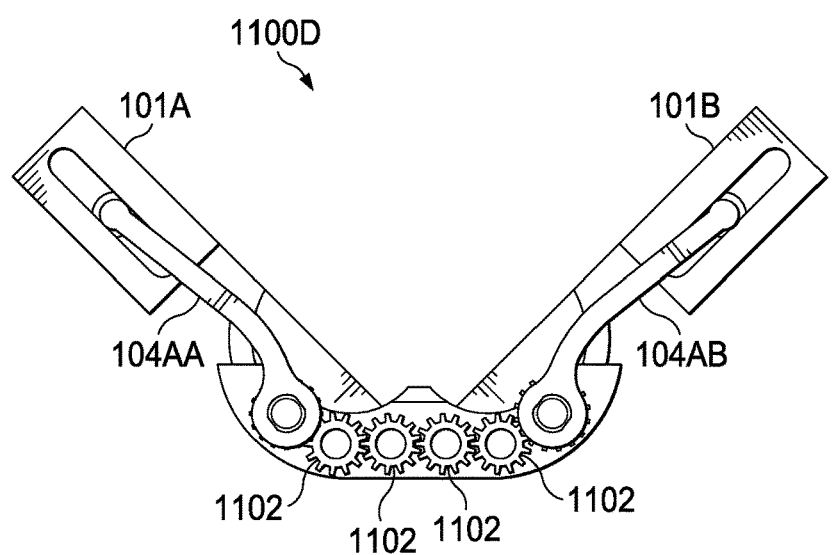
Figure 11E:
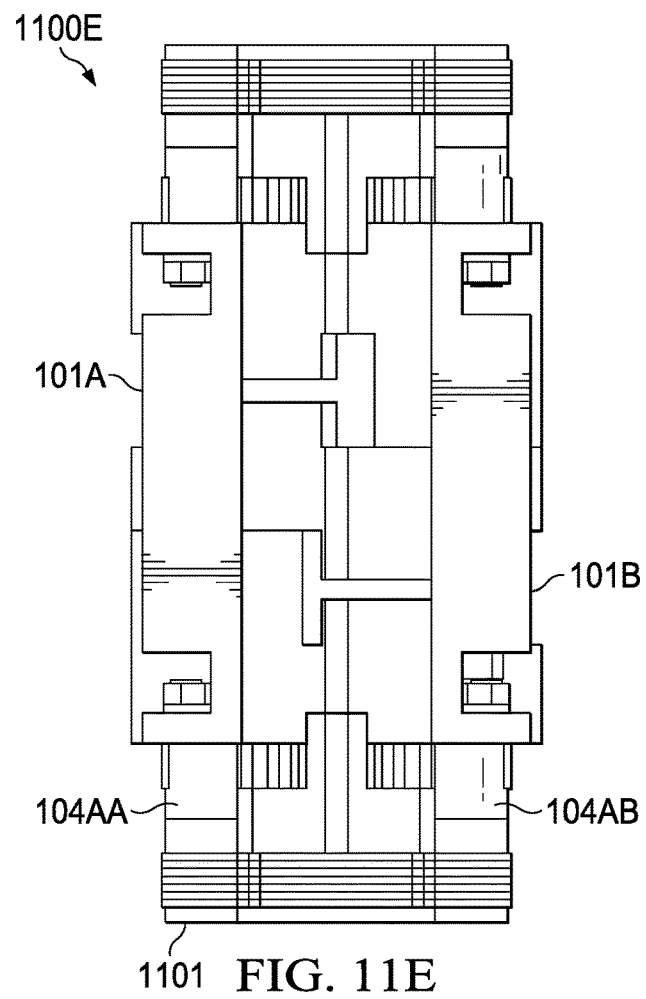
Figure 11F:
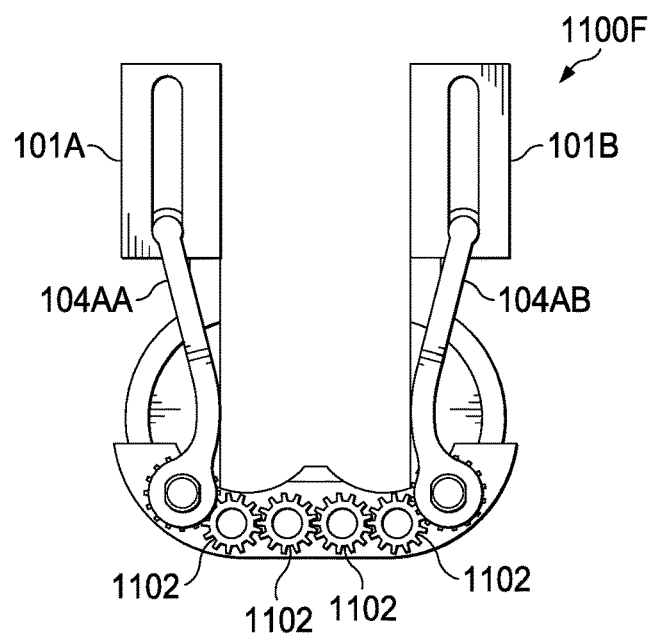
Figure 12D:
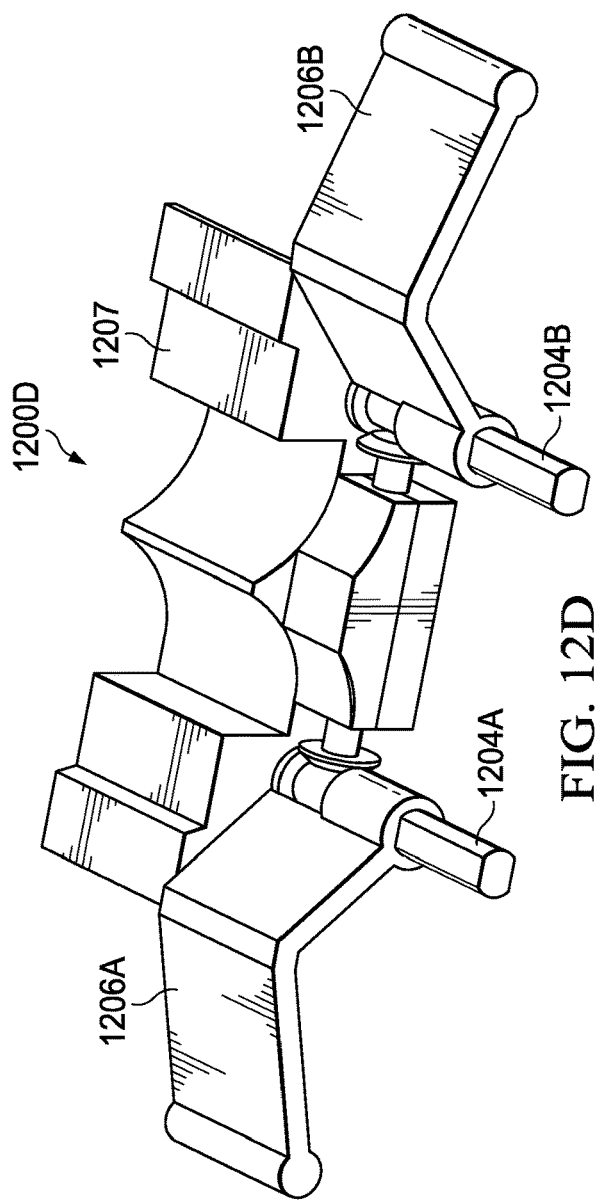
Figure 12E:
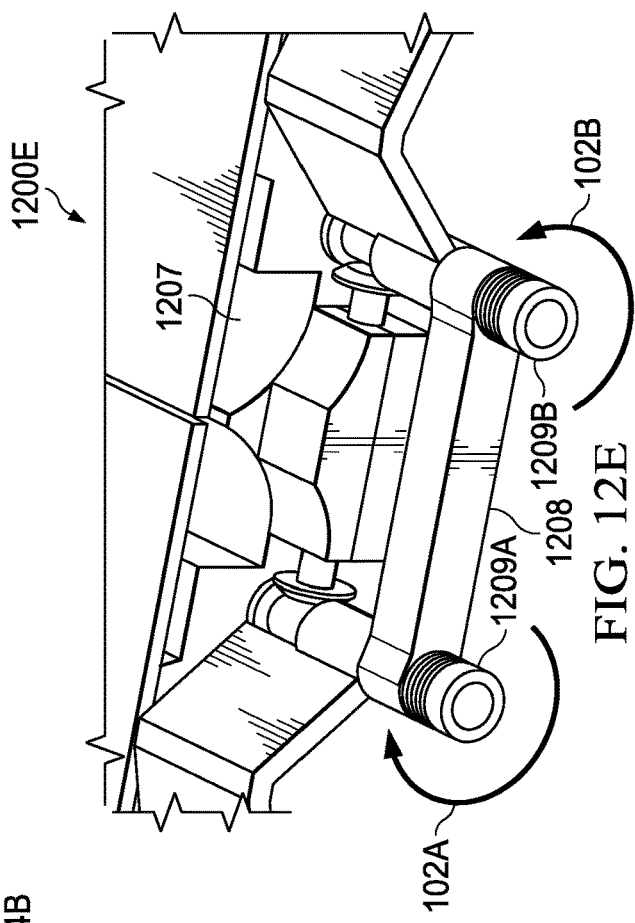

In FIGS. 11C and 11D, views 1100C and 1100D show first and second brackets 101A and 101B with a 90° degree angle between them, and in FIGS. 11E and 11F, views 1100E and 1100F show first and second brackets 101A and 101B with a 0° degree angle between them, as synchronized via gears 1101A, 1102, and 1101B. Although a total of 6 gears is shown in these implementations, the total number of gears may vary with system constraints in other implementations.

FIGS. 12A-E are views of an example of a synchronized hinge with a bevel gear mechanism, according to some embodiments. In alternative implementations, configuration 1200A shows housing 1201 holding synchronization axle 1202 with bevel gears 1203A and 1203B on each end. Configuration 1200B shows the addition of two synchronization shafts 1203A and 1203B having bevel gears 1205A and 1205B coupled to and engaged with bevel gears 1203A and 1203B of synchronization axle 1202. Configuration 1200C shows winged brackets 1206A and 1206B coupled and keyed to synchronization shafts 1204A and 1204B, respectively.

Configuration 1200D shows the addition of outer housing 1207, and configuration 1200E shows fix bracket 1208 and torque modules 1209A and 1209B. In operation, synchronization axle 1202 ties the rotations of the two synchronization shafts 1204A and 1204B together. As shaft 1204A rotates, for example, synchronization axle 1202 also rotates, thus driving shaft 1204B to rotate in a synchronized fashion.

Figure 13A:
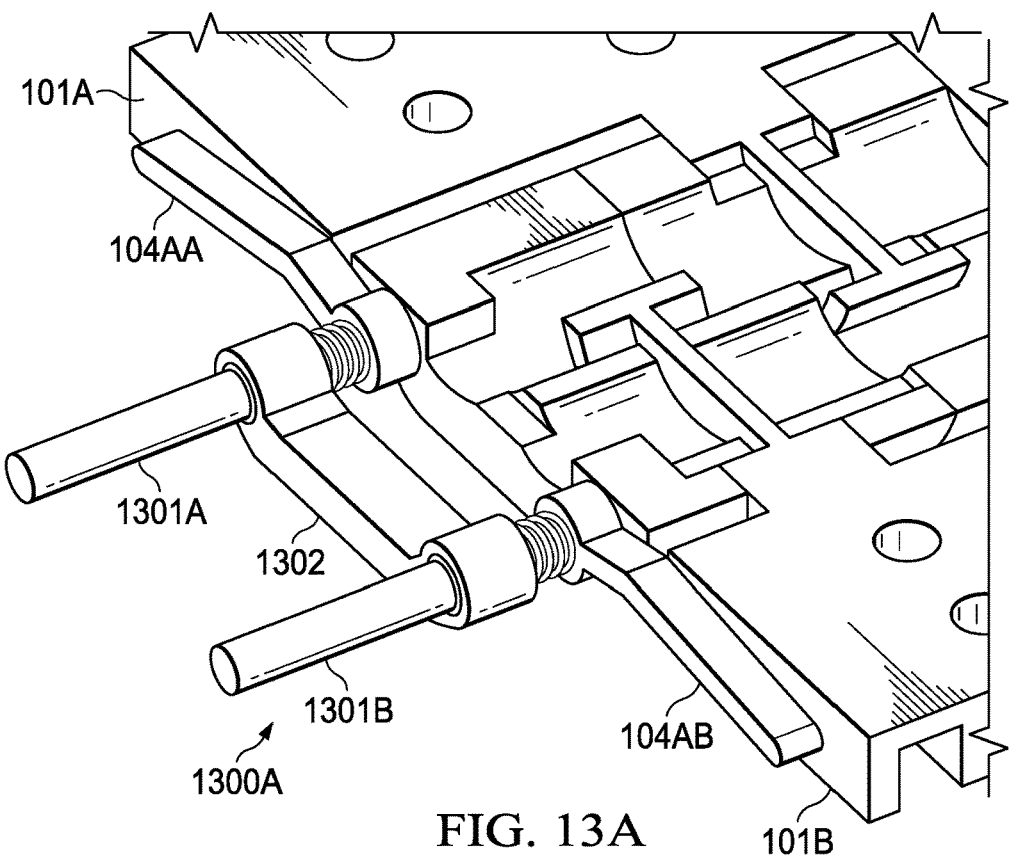
FIGS. 13A-C are views of an example of a synchronized hinge with a leadscrew mechanism, according to some embodiments.
Figure 13B:
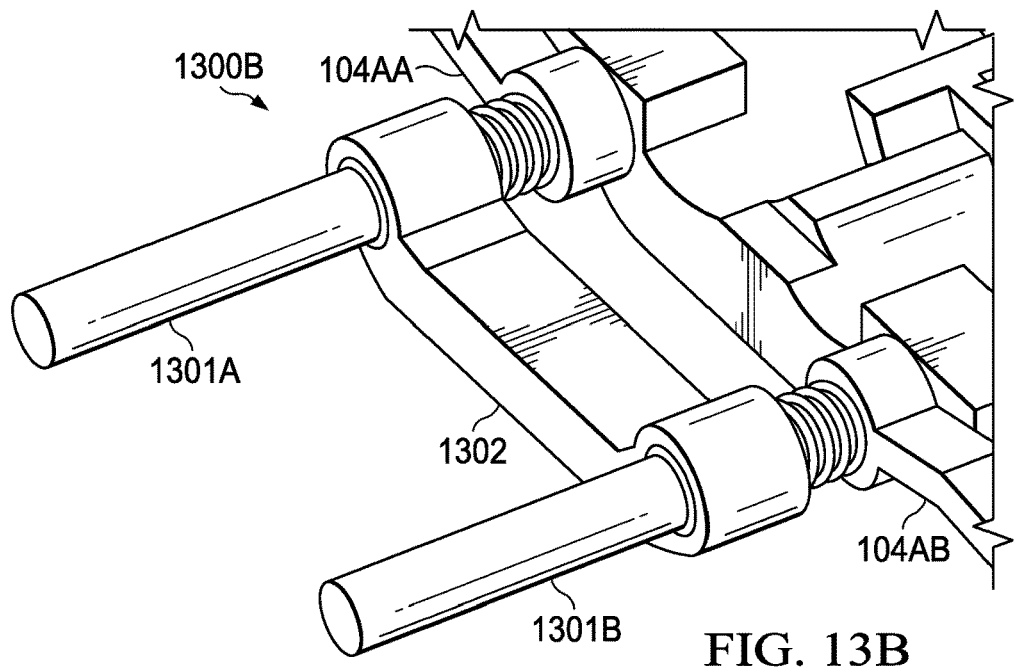
Figure 13C:
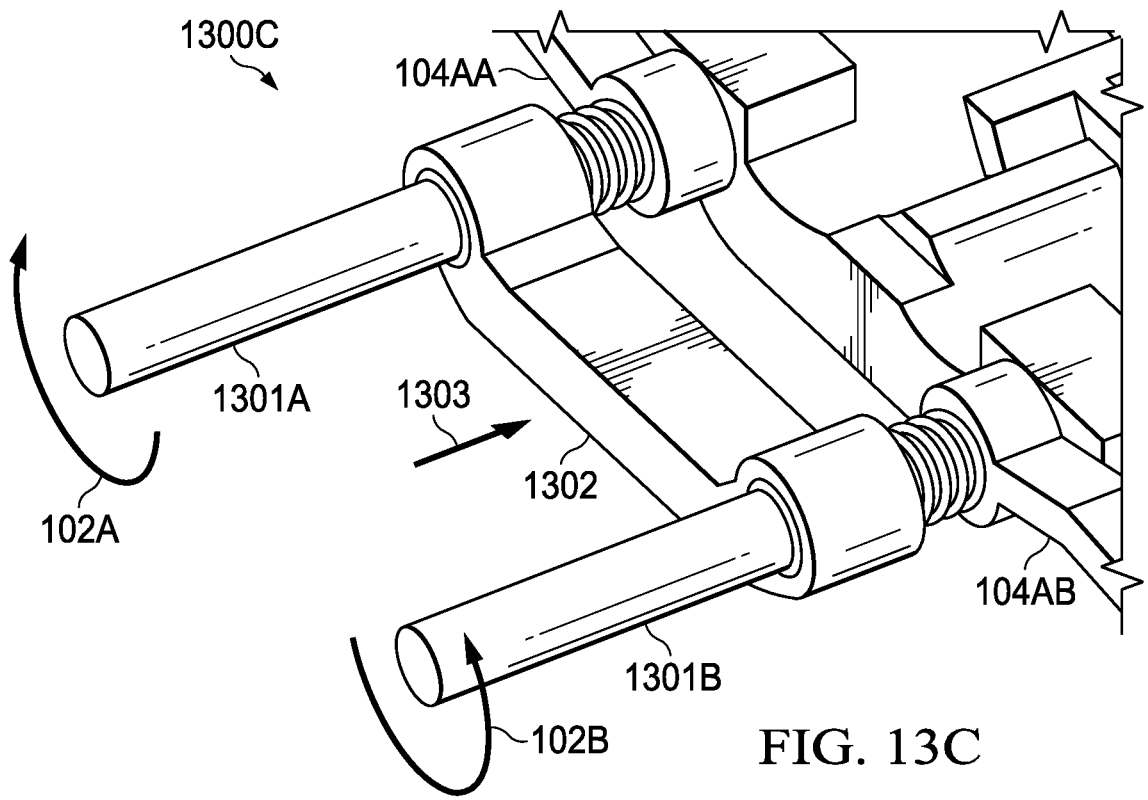

FIGS. 13A-C are views of an example of a synchronized hinge with a leadscrew mechanism, according to some embodiments. In this alternative implementation, as shown in configurations 1300A and 1300B, external threads may be machined onto synchronization shafts 1301A and 1301B and tied to torque arms 104AA and 104AB via synchronization bracket 1302, such that synchronization bracket 1302 has internal threads. In operation, as shown in configuration 1300C, when shaft 1301A rotates in direction 102A, for example, synchronization bracket 1302 translates in direction 1303 thus driving shaft 1301B to rotate in direction 102B.

Figure 14A:
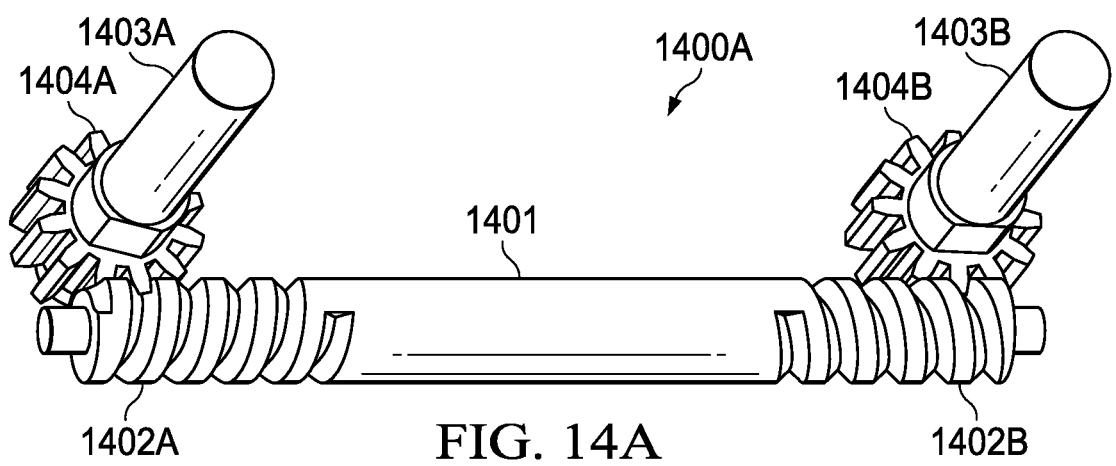
FIGS. 14A-C are views of an example of a synchronized hinge with a worm gear mechanism, according to some embodiments.
Figure 14B:
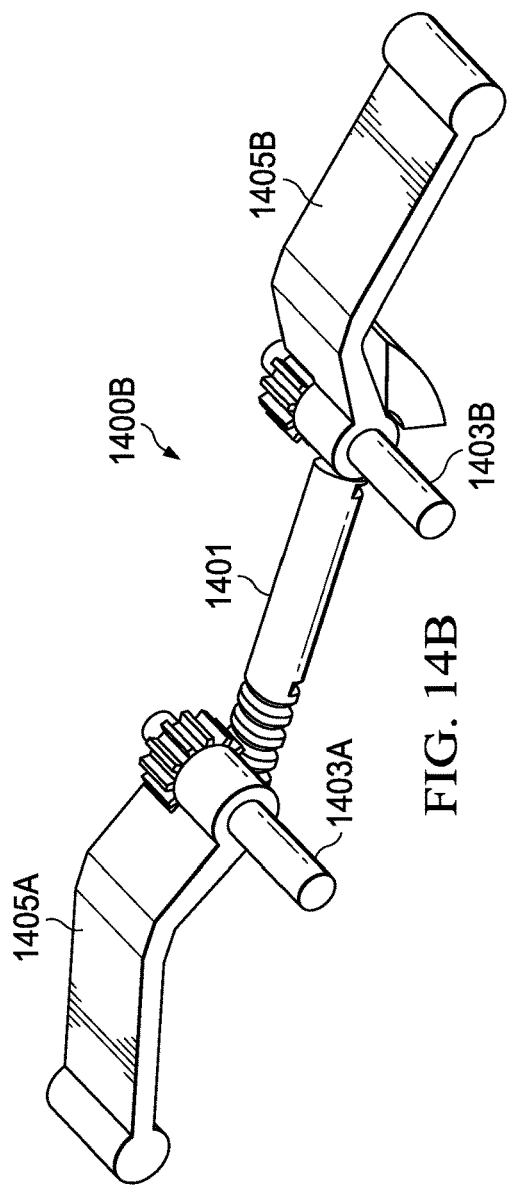
Figure 14C:
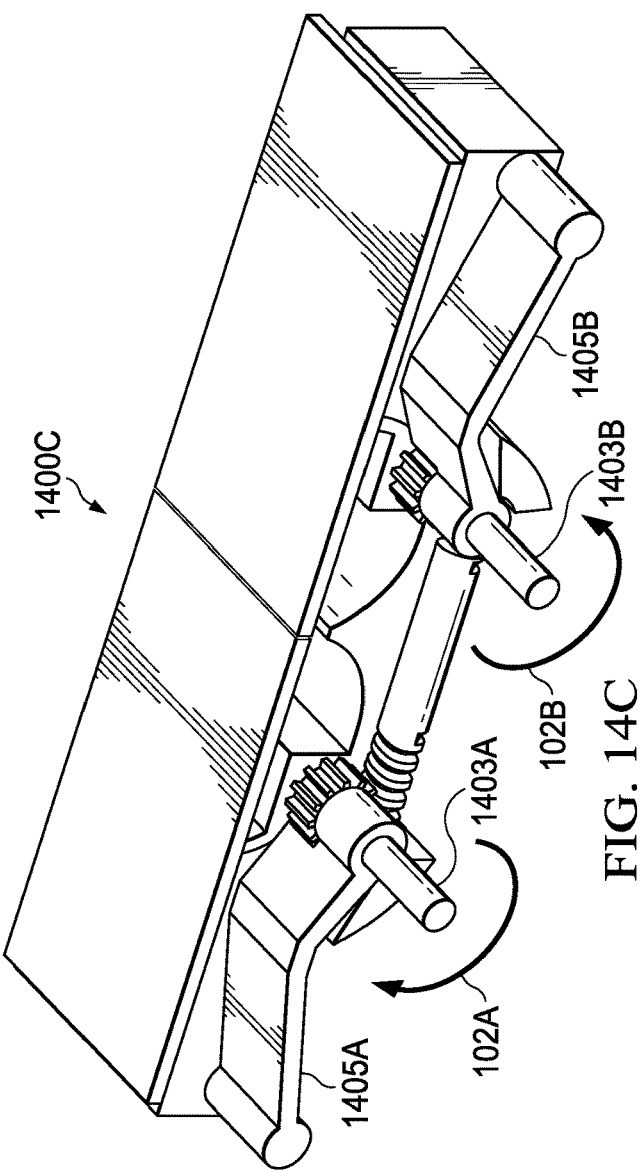

FIGS. 14A-C are views of an example of a synchronized hinge with a worm gear mechanism, according to some embodiments. In this alternative implementation, as shown in configuration 1400A, synchronization axle 1401 has worm gears 1402A and 1402B on each end, thus tying synchronization shafts 1403A and 1403B together view face gears 1404A and 1404B, respectively. Configuration 1400B shows the addition of brackets 1405A and 1405B keyed to synchronization shafts 1403A and 1403B. In operation, as shown in configuration 1400C, as shaft 1403A rotates in direction 102A, for example, synchronization axle 1401 also rotates, thus driving shaft 1403B to rotate in direction 102B.

Figure 15:
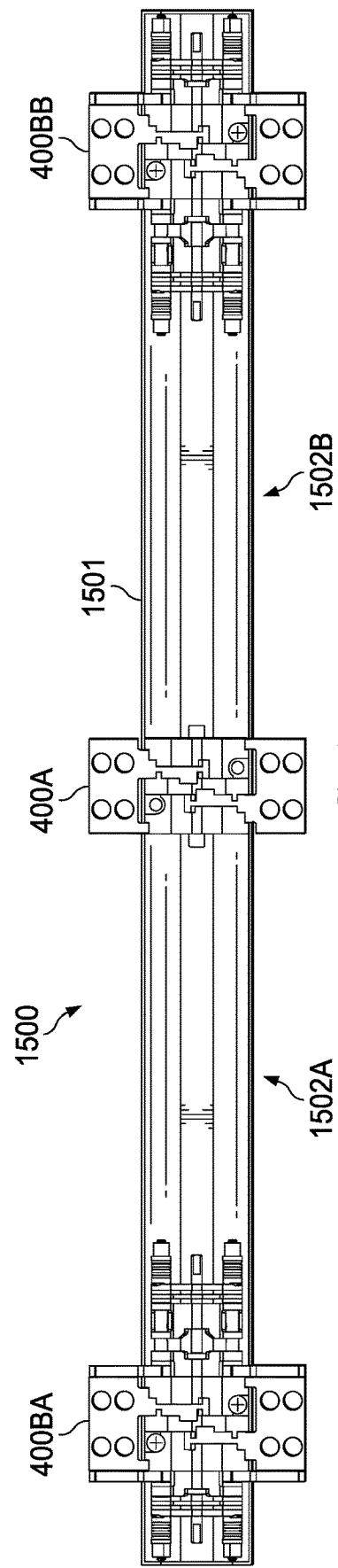
FIGS. 15 is a view of an example of a synchronized hinge system for an Information Handling System (IHS), according to some embodiments.

FIGS. 15 is a view of an example of a synchronized hinge system 1500 for an IHS, according to some embodiments. To achieve the necessary motion, fixed pivot points may be defined to minimize display stress. A plurality of hinge modules may rotate about these pivot points in concentric tracks located in hinge housing 1501. Particularly, in this implementation, hinge housing 1501 holds first hinge module 400BA with a single synchronization bracket on one end, second hinge module 400BB with another single synchronization bracket on another end, and idler hinge 104 in between them. Idler hinge 401 may be used to provide additional structural support to a foldable and/or flexible display, whereas non-hinge regions 1502A and 1502B may be used for component placement (e.g., cables, structure, thermal solution, etc.).

Figure 16A:
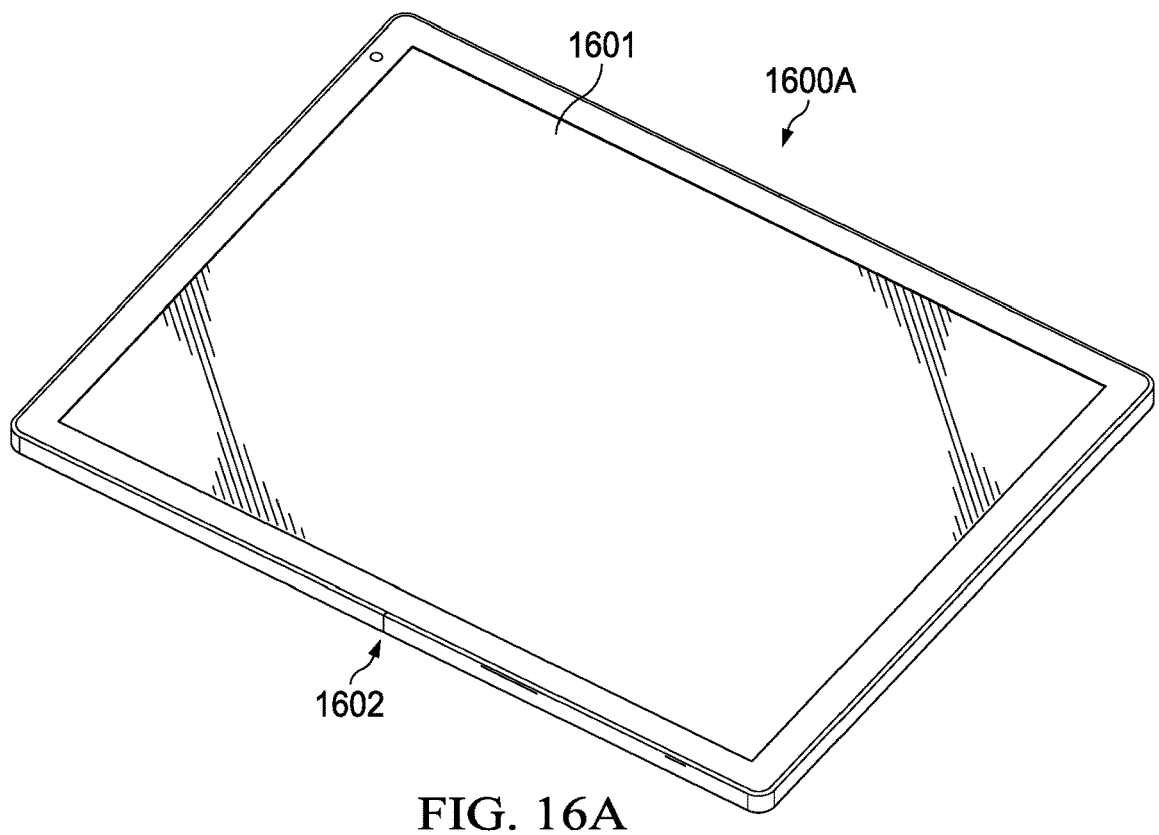
FIGS. 16A and 16B are views of an example of an IHS implementing a synchronized hinge system, according to some embodiments.
Figure 16B:
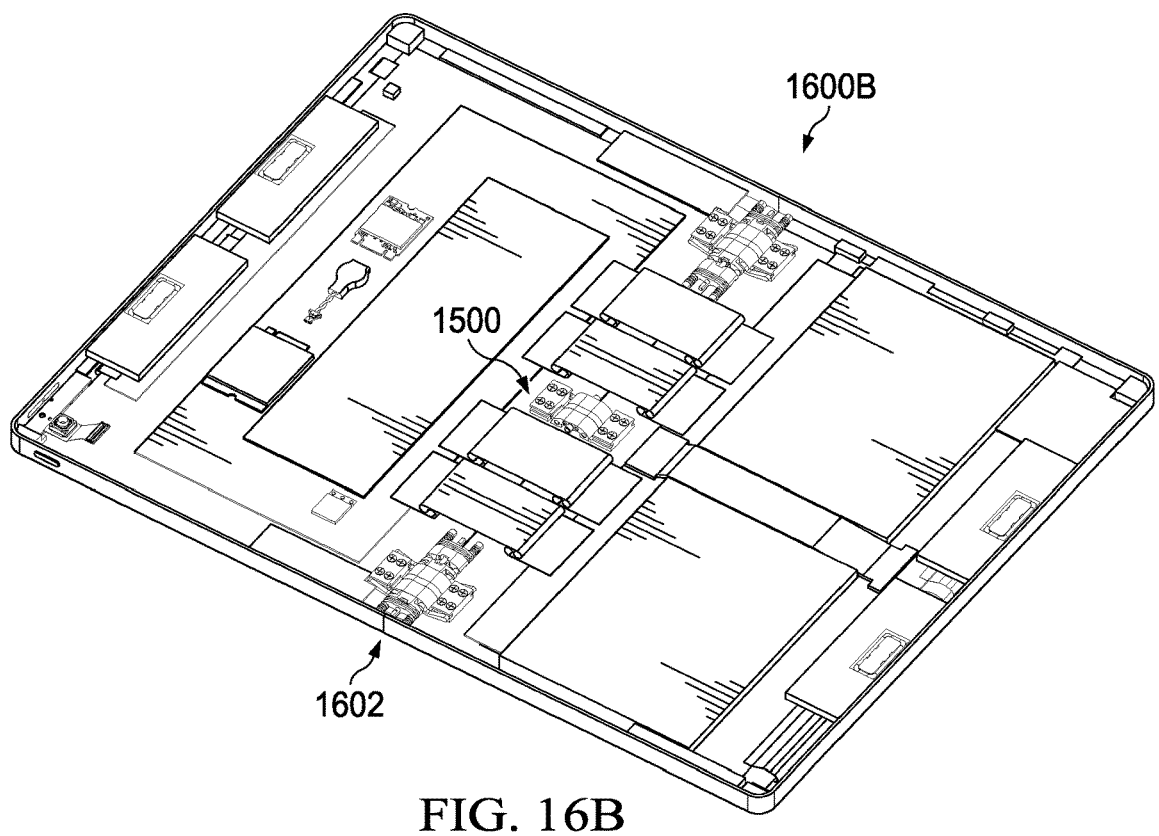

FIGS. 16A and 16B are views of an example of an IHS implementing a synchronized hinge system, according to some embodiments. Specifically, view 1600A shows an IHS with foldable display 1601 and folding axis 1602 (e.g., central axis 103). View 1600B shows the same IHS with foldable display 1601 removed, thus exposing hinge system 1500 of FIG. 15.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 17:
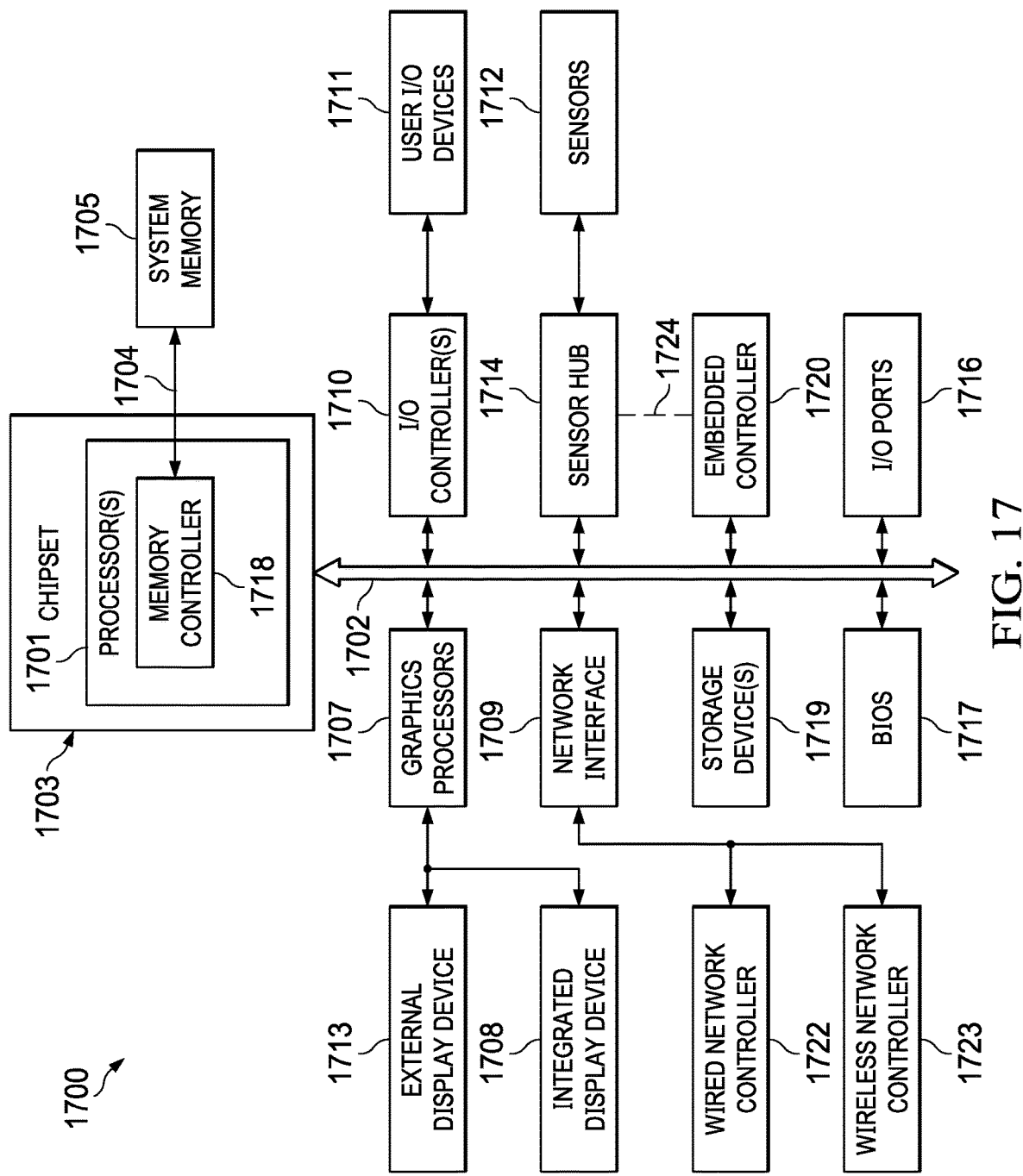
FIG. 17 is a block diagram of an example of internal components of an IHS, according to some embodiments.

FIG. 17 is a block diagram of an example of internal components of IHS 1700, according to some embodiments. As shown, IHS 1700 includes one or more processors 1701, such as a Central Processing Unit (CPU), that execute code retrieved from system memory 1705.

Although IHS 1700 is illustrated with a single processor 1701, other embodiments may include two or more processors, that may each be configured identically, or to provide specialized processing operations. Processor(s) 1701 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 1701 includes an integrated memory controller 1718 that may be implemented directly within the circuitry of processor(s) 1701, or memory controller 1718 may be a separate integrated circuit that is located on the same die as processor(s) 1701. Memory controller 1718 may be configured to manage the transfer of data to and from the system memory 1705 of IHS 1700 via high-speed memory interface 1704. System memory 1705 coupled to processor(s) 1701 provides processor(s) 1701 with a high-speed memory that may be used in the execution of computer program instructions by processor(s) 1701.

Accordingly, system memory 1705 may include memory components, such as static RAM (SRAM), dynamic RAM (DRAM), NAND Flash memory, suitable for supporting high-speed memory operations by processor(s) 1701. In certain embodiments, system memory 1705 may combine both persistent, non-volatile memory and volatile memory. In certain embodiments, system memory 1705 may include multiple removable memory modules.

IHS 1700 utilizes chipset 1703 that may include one or more integrated circuits that are connected to processor(s) 1701. In the embodiment of FIG. 1, processor(s) 1701 is depicted as a component of chipset 1703. In other embodiments, all of chipset 1703, or portions of chipset 1703 may be implemented directly within the integrated circuitry of processor(s) 1701. Chipset 1703 provides processor(s) 1701 with access to a variety of resources accessible via bus 1702.

In IHS 1700, bus 1702 is illustrated as a single element. Various embodiments may utilize any number of separate buses to provide the illustrated pathways served by bus 1702.

In various embodiments, IHS 1700 may include one or more I/O ports 1716 that may support removeable couplings with various types of external devices and systems, including removeable couplings with peripheral devices that may be configured for operation by a particular user of IHS 1700. For instance, I/O 1716 ports may include USB (Universal Serial Bus) ports, by which a variety of external devices may be coupled to IHS 1700. In addition to or instead of USB ports, I/O ports 1716 may include various types of physical I/O ports that are accessible to a user via the enclosure of IHS 1700.

In certain embodiments, chipset 1703 may additionally utilize one or more I/O controllers 1710 that may each support the operation of hardware components such as user I/O devices 1711 that may include peripheral components physically coupled to I/O port 1716 and/or peripheral components that are wirelessly coupled to IHS 1700 via network interface 1709.

In various implementations, I/O controller 1710 may support the operation of one or more user I/O devices 1710 such as a keyboard, mouse, touchpad, touchscreen, microphone, speakers, camera and other input and output devices that may be coupled to IHS 1700. User I/O devices 1711 may interface with an I/O controller 1710 through wired or wireless couplings supported by IHS 1700. In some cases, I/O controllers 1710 may support configurable operation of supported peripheral devices, such as user I/O devices 1711.

As illustrated, a variety of additional resources may be coupled to processor(s) 1701 of IHS 1700 through chipset 1703. For instance, chipset 1703 may be coupled to network interface 1709 that may support different types of network connectivity. IHS 1700 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE).

Network interface 1709 may support network connections by wired network controllers 122 and wireless network controllers 123. Each network controller 122 and 123 may be coupled via various buses to chipset 1703 to support different types of network connectivity, such as the network connectivity utilized by IHS 1700.

As illustrated, IHS 1700 may support integrated display device 1708, such as a display integrated into a laptop, tablet, 2-in-1 convertible device, or mobile device. IHS 1700 may also support use of one or more external displays 1713, such as external monitors that may be coupled to IHS 1700 via various types of couplings, such as by connecting a cable from the external display 1713 to external I/O port 1716 of the IHS 1700.

One or more display devices 1708 and/or 1713 coupled to IHS 1700 may utilize LCD, LED, OLED, or other foldable and/or flexible display technologies. Each display device 1708 and 1713 may be capable of receiving touch inputs such as via a touch controller that may be an embedded component of display device 1708 and/or 1713 or graphics processor 1707, or it may be a separate component of IHS 1700 accessed via bus 1702. In some cases, power to graphics processor 1707, integrated display device 1708 and/or external display 1713 may be turned off or configured to operate at minimal power levels in response to IHS 1700 entering a low-power state (e.g., standby).

In certain scenarios, the operation of integrated displays 1708 and external displays 1713 may be configured for a particular user. For instance, a particular user may prefer specific brightness settings that may vary the display brightness based on time of day and ambient lighting conditions.

As such, chipset 1703 may provide access to one or more display device(s) 1708 and/or 1713 via graphics processor 1707. Graphics processor 1707 may be included within a video card, graphics card or within an embedded controller installed within IHS 1700. Additionally, or alternatively, graphics processor 1707 may be integrated within processor(s) 1701, such as a component of a system-on-chip (SoC). Graphics processor 1707 may generate display information and provide the generated information to one or more display device(s) 1708 and/or 1713, coupled to IHS 1700.

Chipset 1703 also provides processor(s) 1701 with access to one or more storage devices 1719. In various embodiments, storage device 1719 may be integral to IHS 1700 or may be external to IHS 1700. In certain embodiments, storage device 1719 may be accessed via a storage controller that may be an integrated component of the storage device. Storage device 1719 may be implemented using any memory technology allowing IHS 1700 to store and retrieve data.

For instance, storage device 1719 may be a magnetic hard disk storage drive or a solid-state storage drive. In certain embodiments, storage device 1719 may be a system of storage devices, such as a cloud system or enterprise data management system that is accessible via network interface 1709.

As illustrated, IHS 1700 also includes Basic Input/Output System (BIOS) 1717 that may be stored in a non-volatile memory accessible by chipset 1703 via bus 1702. Upon powering or restarting IHS 1700, processor(s) 1701 may utilize BIOS 1717 instructions to initialize and test hardware components coupled to the IHS 1700. BIOS 1717 instructions may also load an operating system (OS) (e.g., WINDOWS, MACOS, iOS, ANDROID, LINUX, etc.) for use by IHS 1700.

BIOS 1717 provides an abstraction layer that allows the operating system to interface with the hardware components of the IHS 1700. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 1700 embodiments may utilize sensor hub 1714 capable of sampling and/or collecting data from a variety of hardware sensors 1712. For instance, sensors 1712, may be disposed within IHS 1700, and/or display 1708, and/or a hinge coupling a display portion to a keyboard portion of IHS 1700, and may include, but are not limited to: electric, magnetic, hall effect, radio, optical, infrared, thermal, force, pressure, touch, acoustic, ultrasonic, proximity, position, location, angle, deformation, bending, direction, movement, velocity, rotation, acceleration, bag state (in or out of a bag), and/or lid sensor(s) (open or closed).

In some cases, one or more sensors 1712 may be part of a keyboard or other input device. Processor 1701 may be configured to process information received from sensors 1712 through sensor hub 1714.

For instance, during operation of IHS 1700, the user may open, close, flip, swivel, or rotate display 1708 to produce different IHS postures. In some cases, processor 1701 may be configured to determine a current posture of IHS 1700 using sensors 1712 (e.g., a lid sensor, a hinge sensor, etc.). For example, in a dual-display IHS implementation, when a first display 1708 (in a first IHS portion) is folded against a second display 1708 (in a second IHS portion) so that the two displays have their backs against each other, IHS 1700 may be said to have assumed a book posture. Other postures may include a table posture, a display posture, a laptop posture, a stand posture, or a tent posture, depending upon whether IHS 1700 is stationary, moving, horizontal, resting at a different angle, and/or its orientation (landscape vs. portrait).

For instance, in a laptop posture, a first display surface of a first display 1708 may be facing the user at an obtuse angle with respect to a second display surface of a second display 1708 or a physical keyboard portion. In a tablet posture, a first display 1708 may be at a straight angle with respect to a second display 1708 or a physical keyboard portion. And, in a book posture, a first display 1708 may have its back resting against the back of a second display 1708 or a physical keyboard portion.

It should be noted that the aforementioned postures, and their various respective keyboard states, are described for sake of illustration. In different embodiments, other postures may be used, for example, depending upon the type of hinge coupling the displays, the number of displays used, or other accessories.

In other cases, processor(s) 1701 may process user presence data received by sensors 1712 and may determine, for example, whether an IHS's end-user is present or absent. Moreover, in situations where the end-user is present before IHS 1700, processor(s) 1701 may further determine a distance of the end-user from IHS 1700 continuously or at pre-determined time intervals. The detected or calculated distances may be used by processor(s) 1701 to classify the user as being in the IHS's near-field (user's position<threshold distance A), mid-field (threshold distance A<user's position <threshold distance B, where B>A), or far-field (user's position>threshold distance C, where C>B) with respect to IHS 1700 and/or display 1708.

More generally, in various implementations, processor 1701 may receive and/or produce context information using sensors 1712 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 1700, a physical keyboard external to IHS 1700, or an on-screen keyboard), whether the user operating the keyboard is typing with one or two hands (e.g., holding a stylus, or the like), a time of day, software application(s) under execution in focus for receiving keyboard input, whether IHS 1700 is inside or outside of a carrying bag, ambient lighting, a battery charge level, whether IHS 1700 is operating from battery power or is plugged into an AC power source (e.g., whether the IHS is operating in AC-only mode, DC-only mode, or AC+DC mode), a power consumption of various components of IHS 1700 (e.g., CPU 1701, GPU 1707, system memory 1705, etc.).

In certain embodiments, sensor hub 1714 may be an independent microcontroller or other logic unit that is coupled to the motherboard of IHS 1700. Sensor hub 1714 may be a component of an integrated system-on-chip incorporated into processor 1701, and it may communicate with chipset 1703 via a bus connection such as an Inter-Integrated Circuit ($I^2C$) bus or other suitable type of bus connection. Sensor hub 1714 may also utilize an $I^2C$ bus for communicating with various sensors supported by IHS 1700.

As illustrated, IHS 1700 may utilize embedded controller (EC) 1720, which may be a motherboard component of IHS 1700 and may include one or more logic units. In certain embodiments, EC 1720 may operate from a separate power plane from the main processors 1701 and thus the OS operations of IHS 1700. Firmware instructions utilized by EC 1720 may be used to operate a secure execution system that may include operations for providing various core functions of IHS 1700, such as power management, management of operating modes in which IHS 1700 may be physically configured and support for certain integrated I/O functions. In some embodiments, EC 1720 and sensor hub 1714 may communicate via an out-of-band signaling pathway or bus 1724.

In various embodiments, IHS 1700 may not include each of the components shown in FIG. 17. Additionally, or alternatively, IHS 1700 may include various additional components in addition to those that are shown in FIG. 17. Furthermore, some components that are represented as separate components in FIG. 17 may in certain embodiments instead be integrated with other components. For example, in certain embodiments, all or a portion of the functionality provided by the illustrated components may instead be provided by components integrated into the one or more processor(s) 1701 as an SoC.

Accordingly, systems and methods described herein provide synchronized hinges for foldable displays. In various embodiments, these hinges may include: a compact and simple synchronization mechanism, reduced thickness, stress-free folding, modular sub-system design, and/or independent torque module tuning based upon unique and/or individual component manufacturing tolerances.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A hinge, comprising:
a first bracket coupled to a first shaft via a first arm;
a second bracket coupled to a second shaft via a second arm; and
a synchronization bracket coupled to the first and second shafts, wherein the first shaft is disposed along a first axis, wherein the second shaft is disposed along a second axis parallel to the first axis, wherein the first and second brackets are configured to rotate around a center axis between the first and second axes, and wherein the synchronization bracket comprises at least one first pin coupled to at least one first slot in the first shaft and at least one second pin coupled to at least one second slot in the second shaft.

2. The hinge of claim 1, wherein rotation of the first bracket around the center axis causes: rotation of the first shaft around the first axis, translation of the synchronization bracket with respect to the first and second brackets, rotation of the second bracket around the second axis, and rotation of the second bracket around the center axis.

3. The hinge of claim 2, wherein a first amount of rotation of the first bracket around the center axis is equal to a second amount of rotation of the second bracket around the center axis.

4. The hinge of claim 1, further comprising a middle housing between the first and second brackets, wherein the first and second brackets each comprise a semi-circular lip coupled to a corresponding semi-circular slot on each side of the middle housing.

5. The hinge of claim 4, wherein the middle housing is configured to restrict a maximum angle of rotation between the first and second brackets.

6. The hinge of claim 1, wherein the first arm is slidably coupled to a longitudinal slot of a lateral surface of the first bracket, and wherein the second arm is slidably coupled to a longitudinal slot of a lateral surface of the second bracket.

7. The hinge of claim 1, wherein the first arm is keyed to the first shaft, and wherein the second arm is keyed to the second shaft.

8. The hinge of claim 1, wherein the at least one first pin engages with a first entrance of the at least one first slot and the at least one second pin engages with a second entrance of the at least one second slot in response to a straight angle between the first and second brackets.

9. The hinge of claim 1, wherein the at least one first pin engages with a first end of the at least one first slot and the at least one second pin engages with a second end of the at least one second slot in response to a zero angle between the first and second brackets.

10. The hinge of claim 1, wherein the at least one first slot at least partially spirals around a first surface of the first shaft, and wherein the at least one second slot at least partially spirals around the second shaft.

11. The hinge of claim 1, further comprising a torque module coupled to the first and second shafts.

12. The hinge of claim 1, further comprising:
a third arm coupled to the first bracket and to a first torque shaft;
a fourth arm coupled to the second bracket and to a second torque shaft; and
a torque module coupled to the first and second torque shafts.

13. The hinge of claim 1, wherein the synchronization bracket comprises a spur gear.

14. The hinge of claim 1, wherein the synchronization bracket comprises a bevel gear.

15. The hinge of claim 1, wherein the synchronization bracket comprises an internal thread configured to be coupled to a leadscrew.

16. The hinge of claim 1, wherein the synchronization bracket comprises a worm gear.

17. An Information Handling System (IHS), comprising:
a flexible display; and
a hinge coupled to the flexible display, the hinge comprising:
  a first bracket coupled to a first shaft via a first arm;
  a second bracket coupled to a second shaft via a second arm; and
  a synchronization bracket coupled to the first and second shafts, wherein the first shaft is disposed along a first axis, wherein the second shaft is disposed along a second axis parallel to the first axis, wherein the first and second brackets are configured to rotate around a center axis between the first and second axes, and wherein the synchronization bracket comprises at least one first pin coupled to at least one first slot in the first shaft and at least one second pin coupled to at least one second slot in the second shaft.

18. The IHS of claim 17, wherein the hinge further comprises a middle housing between the first and second brackets, wherein the first and second brackets each comprise a semi-circular lip coupled to a corresponding semi-circular slot on each side of the middle housing.

19. A method, comprising:
providing a hinge; and
rotating a first bracket of the hinge around a center axis, wherein the rotation of the first bracket synchronously rotates a second bracket around the center axis, at least in part, by:
  rotating a first shaft around a first axis parallel to the center axis via a first arm coupled to a longitudinal slot of a lateral surface of the first bracket;
  translating a synchronization bracket with respect to the first and second brackets, wherein the synchronization bracket comprises at least one first pin coupled to at least one first slot in the first shaft, and at least one second pin coupled to at least one second slot in a second shaft; and
  rotating the second shaft around a second axis parallel to the center axis via a second arm coupled to a longitudinal slot of a lateral surface of the second bracket.

20. The method of claim 19, wherein a first amount of rotation of the first bracket of the hinge around the center axis is equal to a second amount of rotation of the second bracket around the center axis.

* * * * *